(12) United States Patent
Vaseem et al.

(10) Patent No.: US 11,858,196 B2
(45) Date of Patent: Jan. 2, 2024

(54) IRON OXIDE NANOPARTICLE-BASED MAGNETIC INK FOR ADDITIVE MANUFACTURING

(71) Applicant: King Abdullah University of Science and Technology, Thuwal (SA)

(72) Inventors: Mohammad Vaseem, Thuwal (SA); Farhan Abdul Ghaffar, Thuwal (SA); Atif Shamim, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 18/084,996

(22) Filed: Dec. 20, 2022

(65) Prior Publication Data

US 2023/0134927 A1 May 4, 2023

Related U.S. Application Data

(62) Division of application No. 16/274,926, filed on Feb. 13, 2019, now abandoned.
(Continued)

(51) Int. Cl.
*B29C 64/112* (2017.01)
*H01F 1/44* (2006.01)
*H01F 41/04* (2006.01)
*B33Y 70/10* (2020.01)
*B82Y 25/00* (2011.01)
(Continued)

(52) U.S. Cl.
CPC ............ *B29C 64/112* (2017.08); *B33Y 70/10* (2020.01); *H01F 1/445* (2013.01); *H01F 41/043* (2013.01); *B22F 10/22* (2021.01); *B29K 2105/162* (2013.01); *B29K 2509/00* (2013.01); *B29K 2995/0008* (2013.01); *B33Y 10/00* (2014.12); *B82Y 25/00* (2013.01); *B82Y 40/00* (2013.01)

(58) Field of Classification Search
CPC ....... B29C 64/112; B33Y 70/10; B33Y 10/00; H01F 1/445; H01F 41/043; B22F 10/22; B29K 2105/162; B29K 2509/00; B29K 2995/0008; B82Y 25/00; B82Y 40/00
See application file for complete search history.

(56) References Cited

U.S. PATENT DOCUMENTS 3,922,388 A * 11/1975 Schebalin .............. H01C 17/02
338/308
2001/0022259 A1* 9/2001 Sawa ................. G08B 13/2471
194/302
(Continued)

FOREIGN PATENT DOCUMENTS

WO 2017103797 A1 6/2017

OTHER PUBLICATIONS http://www.microchem.com/Prod-SU8_KMPR.htm, MicroChem Negative Epoxy Resists, Innovative Chemical Solutions for MEMS and Microelectronics; last viewed Feb. 13, 2019.
(Continued)

*Primary Examiner* — Nahida Sultana
(74) *Attorney, Agent, or Firm* — Billion & Armitage

(57) ABSTRACT

Embodiments of the present disclosure describe a magnetic substrate including a cured magnetic ink and a cured polymer resin, wherein the cured magnetic ink includes a plurality of functionalized magnetic iron oxide nanoparticles and wherein the magnetic substrate is a freestanding magnetic substrate.

13 Claims, 26 Drawing Sheets

Related U.S. Application Data

(60) Provisional application No. 62/742,675, filed on Oct. 8, 2018, provisional application No. 62/633,416, filed on Feb. 21, 2018.

(51) Int. Cl.
  *B33Y 10/00*     (2015.01)
  *B29K 105/16*    (2006.01)
  *B29K 509/00*    (2006.01)
  *B82Y 40/00*     (2011.01)
  *B22F 10/22*     (2021.01)

(56) References Cited

U.S. PATENT DOCUMENTS

| | | | |
|---|---|---|---|
| 2004/0234898 A1* | 11/2004 | Batishko | B81C 99/0095 430/311 |
| 2011/0123398 A1* | 5/2011 | Carrilho | F16K 99/0001 422/68.1 |
| 2012/0236090 A1 | 9/2012 | Iftime et al. | |
| 2015/0177153 A1 | 6/2015 | Milos et al. | |
| 2018/0155561 A1* | 6/2018 | Li | C09C 1/24 |
| 2019/0228889 A1 | 7/2019 | Yamaga et al. | |
| 2019/0259517 A1* | 8/2019 | Vaseem | H01F 41/043 |
| 2019/0284423 A1 | 9/2019 | Bodkhe et al. | |
| 2020/0027921 A1 | 1/2020 | Liu et al. | |
| 2022/0218881 A1 | 7/2022 | Cook et al. | |

OTHER PUBLICATIONS

Arabi, et al., "Tunable Bandpass Filter Based on Partially Magnetized Ferrite LTCC With Embedded Windings for SoP Applications", IEEE Microwave and Wireless Components Letters, vol. 25, No. 1, Jan. 2015, pp. 16-18.
Baby, et al., "A General Route toward Complete Room Temperature Processing of Printed and High Performance Oxide Electronics", ACS Nano, vol. 9, 2015, 9 pages.
Bhattacharya, et al., "Hybrid Nanostructured C-Dot Decorated Fe3O4 Electrode Materials for Superior Electrochemical Energy Storage Performance", Dalton Transactions, vol. 44, Mar. 27, 2015, 9 pages.
Bissannagari, et al., "Inkjet Printing of NiZn-Ferrite Films and Their Magnetic Properties", Ceramics International, vol. 41, 2015, pp. 8023-8027.
Boehm, et al., "Inkjet Printing for Pharmaceutical Applications", Materials Today, vol. 17, No. 5, Jun. 2014, pp. 247-252.
Bray, et al., "Characterization of an Experimental Ferrite LTCC Tape System for Microwave and Millimeter-Wave Applications", IEEE Transactions on Advanced Packaging, vol. 27, No. 3, Aug. 2004, pp. 558-565.
Choi, et al., "Exploiting the Colloidal Nanocrystal Library to Construct Electronic Devices", Science, vol. 352, Issue 6282, Apr. 8, 2016, pp. 205-208.
Farooqui, et al., "3D-Printed Disposable Wireless Sensors with Integrated Microelectronics for Large Area Environmental Monitoring", Advanced Materials Technologies, vol. 2, No. 1700051, 2017, pp. 1-9.
Farooqui, et al., "Low Cost Inkjet Printed Smart Bandage for Wireless Monitoring of Chronic Wounds", Scientific Reports, vol. 6, No. 28949, Jun. 29, 2016, pp. 1-13.
Ghaffar, et al., "A Ferrite LTCC Based Dual Purpose Helical Antenna Providing Bias for Tunability", IEEE Antennas and Wireless Propagation Letters, vol. 14, 2015, pp. 831-834.
Ghaffar, Farhan A, et al., "A Ferrite Nano-particles Based Fully Printed Process for Tunable Microwave Components", 2016 IEEE MTT-S International Microwave Symposium (IMS), 2016, 3 pages.
Ghaffar, Farhan A., et al., "A Fully Printed Ferrite Nano-particle Ink Based Tunable Antenna", 2016 IEEE International Symposium on Antennas and Propagation (APSURSI), 2016, pp. 1059-1060.
Ghaffar, Farhan A., et al., "A Magnetic Nano-particle Ink for Tunable Microwave Applications", IEEE Middle East Conference on Antennas and Propagation (MECAP)(2016). Available: http://dx.doi.org/10.1109/MECAP.2016.7790109., Dec. 19, 2016.
Ghaffar, et al., "A Partially Magnetized Ferrite LTCC-Based SIW Phase Shifter for Phased Array Applications", IEEE Transactions on Magnetics, vol. 51, No. 6, Jun. 2015, 8 pages.
Ghaffar, et al., "Theory and Design of a Tunable Antenna on a Partially Magnetized Ferrite LTCC Substrate", IEEE Transactions on Antennas and Propagation, vol. 62, No. 3, Mar. 2014, pp. 1238-1245.
Grau, et al., "Fully High-Speed Gravure Printed, Low-Variability, High-Performance Organic Polymer Transistors with Sub-5 V Operation", Advanced Electronic Materials, vol. 2, No. 1500328, 2016, pp. 1-8.
Huber, et al., "Fully Inkjet Printed Flexible Resistive Memory", Applied Physics Letters, vol. 110, 2017, pp. 143503-1-143503-4.
Hyun, et al., "All-Printed, Foldable Organic Thin-Film Transistors on Glassine Paper", Advanced Materials, vol. 27, 2015, pp. 1-7.
Jung, et al., "All-Inkjet-Printed, All-Air-Processed Solar Cells", Advanced Energy Materials, vol. 4, 1400432, 2014, pp. 1-9.
Kang, et al., "Liquid Immersion Thermal Crosslinking of 3D Polymer Nanopatterns for Direct Carbonisation With High Structural Integrity", Scientific Reports, vol. 5, No. 18185, Dec. 18, 2015, pp. 1-8.
Krykpayev, Bauyrzhan, et al., "A Wearable Tracking Device Inkjet-printed on Textile", King Abdullah University of Science and Technology (KAUST), IMPACT Lab, Computer, Electrical and Mathematical Sciences and Engineering (CEMSE) Division, Thuwal 23955-6900, Saudi Arabia, May 20, 2017.
Lee, et al., "Inkjet Printed High-Q Rf Inductors on Paper Substrate With Ferromagnetic Nanomaterial", IEEE Microwave and Wireless Components Letters, vol. 26, 2016, pp. 419-421.
Lee, et al., "Inkjet-Printed Ferromagnetic Nanoparticles for Miniaturization of Flexible Printed RF Inductors", IEEE Antennas and Propagation Society International Symposium (APSURSI), 2013, pp. 994-995.
Lien, et al., "All-Printed Paper Memory", ACS Nano, vol. 8, No. 8, Jul. 14, 2014, pp. 7613-7619.
Marin, et al., "Influence of Surface Treatment on Magnetic Properties of Fe3O4 Nanoparticles Synthesized by Electrochemical Method", The Journal of Physical Chemistry B, vol. 120, Jun. 7, 2016, pp. 6634-6645.
McKerricher, et al., "Fully Inkjet-Printed Microwave Passive Electronics", Microsystems & Nanoengineering, vol. 3, 2017, pp. 1-7.
McKerricher, Garret, et al., "Inkjet-Printed Thin Film Radio-Frequency Capacitors Based on Sol-Gel Derived Alumina Dielectric Ink", Ceramics International, vol. 43, 2017, pp. 9846-9853.
McManus, et al., "Water-Based and Biocompatible 2D Crystal Inks for All-Inkjet-Printed Heterostructures", Nature Nanotechnology, vol. 12, Jan. 30, 2017, 8 pages.
Murphy, et al., "3D Bioprinting of Tissues and Organs", Nature Biotechnology, vol. 32, No. 8, Aug. 2014, pp. 773-785.
Nafe, et al., "An Integrable SIW Phase Shifter in a Partially Magnetized Ferrite LTCC Package", IEEE Transactions on Microwave Theory and Techniques, vol. 63, No. 7, Jul. 2015, pp. 2264-2274.
Ning, et al., "A Tunable Magnetic Inductor", IEEE Transactions on Magnetics, vol. 42, No. 5, May 2006, pp. 1585-1590.
Park, et al., "Printed Assemblies of Inorganic Light-Emitting Diodes for Deformable and Semitransparent Displays", Science, vol. 325, Aug. 21, 2009, pp. 977-981.
Patsula, et al., "Superparamagnetic Fe3O4 Nanoparticles: Synthesis by Thermal Decomposition of Iron(III) Glucuronate and Application in Magnetic Resonance Imaging", ACS Applied Materials & Interfaces, vol. 8, Feb. 29, 2016, pp. 7238-7247.
Petosa, et al., "Magnetically Tunable Ferrite Resonator Antenna", Electronics Letters, vol. 30, No. 13, Jun. 23, 1994, pp. 1021-1022.
Pozar, et al., "Magnetic Tuning of a Microstrip Antenna on a Ferrite Substrate", Electronics Letters, vol. 24, No. 12, Jun. 9, 1988, pp. 729-731.

(56) References Cited

OTHER PUBLICATIONS

Pozar, "Radiation and Scattering Characteristics of Microstrip Antennas on Normally Biased Ferrite Substrates", IEEE Transactions on Antennas and Propagation, vol. 40, No. 9, Sep. 1992, pp. 1084-1092.

Quddious, et al., "Disposable, Paper-Based, Inkjet-Printed Humidity and H2S Gas Sensor for Passive Sensing Applications", Sensors, vol. 16, 2073, Dec. 6, 2016, pp. 1-13.

Sayed, et al., "Facile and Sustainable Synthesis of Shaped Iron Oxide Nanoparticles: Effect of Iron Precursor Salts on the Shapes of Iron Oxides", Scientific Reports, vol. 5, No. 9733, May 5, 2015, pp. 1-14.

Scheideler, et al., "Low-Temperature-Processed Printed Metal Oxide Transistors Based on Pure Aqueous Inks", Advanced Functional Materials, vol. 27, 1606062, 2017, pp. 1-11.

Shamim, et al., "Ferrite LTCC-Based Antennas for Tunable SoP Applications", IEEE Transactions on Components, Packaging and Manufacturing Technology, vol. 1, No. 7, Jul. 2011, pp. 999-1006.

Si, et al., "Solvothermal Synthesis of Tunable Iron Oxide Nanorods and Their Transfer From Organic Phase to Water Phase", Crystal Engineering Communication, vol. 16, Nov. 14, 2013, pp. 512-516.

Song, et al., "Inkjet Printing of Magnetic Materials With Aligned Anisotropy", Journal of Applied Physics, vol. 115, Jan. 29, 2014, pp. 17E308-1-17E308-3.

Tan, et al., "Magnetically Tunable Ferrite Loaded SIW Antenna", IEEE Antennas and Wireless Propagation Letters, vol. 12, 2013, pp. 273-275.

Tsang, et al., "Design of Circular Patch Antennas on Ferrite Substrates", IEE Proceedings—Microwaves, Antennas and Propagation, vol. 145, Issue 1, Feb. 1998, pp. 49-55.

Vaseem, Mohammad, et al., "3D Inkjet Printed Radio Frequency Inductors and Capacitors", 2016 11th European Microwave Integrated Circuits Conference (EuMIC). Available: http://dx.doi.org/10.1109/EuMIC.2016.7777612., Dec. 8, 2016.

Vaseem, et al., "Copper Oxide Quantum Dot Ink for Inkjet-Driven Digitally Controlled High Mobility Field Effect Transistors", Journal of Materials Chemistry C, vol. 1, Jan. 24, 2013, pp. 2112-2120.

Vaseem, et al., "Green Chemistry of Glucose-Capped Ferromagnetic hcp-Nickel Nanoparticles and Their Reduced Toxicity", RSC Advances, vol. 3, Apr. 4, 2013, pp. 9698-9704.

Vaseem, Mohammad, et al., "Iron Oxide Nanoparticle-Based Magnetic Ink Development for FUlly Printed Tunable Radio-Frequency Devices", Advanced Materials Technologies,, 2018, 1-11.

Vaseem, et al., "Robust Design of a Particle-Free Silver-Organo-Complex Ink with High Conductivity and Inkjet Stability for Flexible Electronics", ACS Applied Materials & Interfaces, vol. 8, 2015, 10 pages.

Vuorinen, et al., "Inkjet-Printed Graphene/PEDOT:PSS Temperature Sensors on a Skin-Conformable Polyurethane Substrate", Scientific Reports, vol. 6, No. 35289, Oct. 18, 2016, pp. 1-8.

Wu, et al., "Facile Hydrothermal Synthesis of Fe3O4/C Core-Shell Nanorings for Efficient Low-Frequency Microwave Absorption", ACS Applied Materials & Interfaces, vol. 8, Feb. 26, 2016, pp. 7370-7380.

Wu, et al., "Recent Progress on Magnetic Iron Oxide Nanoparticles: Synthesis, Surface Functional Strategies and Biomedical Applications", Science and Technology of Advanced Materials, vol. 16, 023501, Apr. 28, 2015, 43 pages.

Yang, et al., "Core/Shell Iron/Oxide Nanoparticles for Improving the Magneto-Dielectric Properties of Polymer Composites", Advanced Engineering Materials, vol. 18, No. 1, 2016, pp. 121-126.

Zhuang, et al., "Hydrophilic Magnetochromatic Nanoparticles with Controllable Sizes and Super-high Magnetization for Visualization of Magnetic Field Intensity", Scientific Reports, vol. 5, No. 17063, Nov. 23, 2015, pp. 1-9.

\* cited by examiner

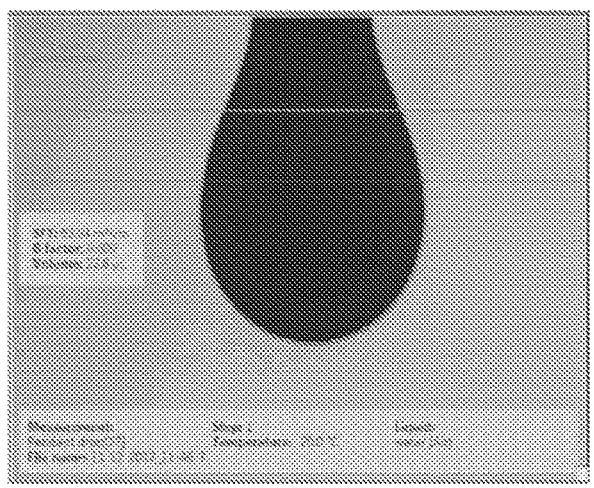 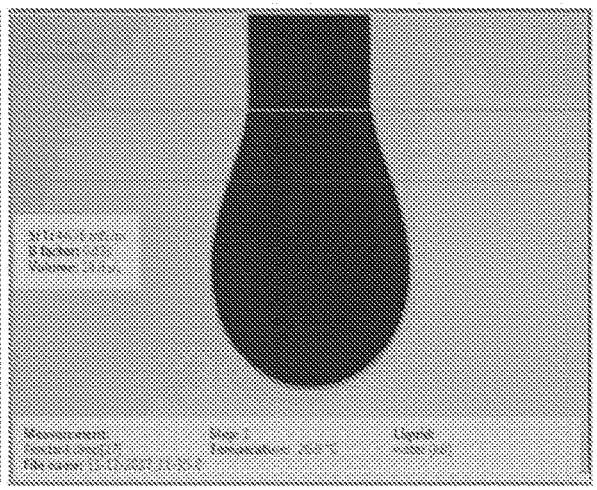
FIG. 7A                    FIG. 7B

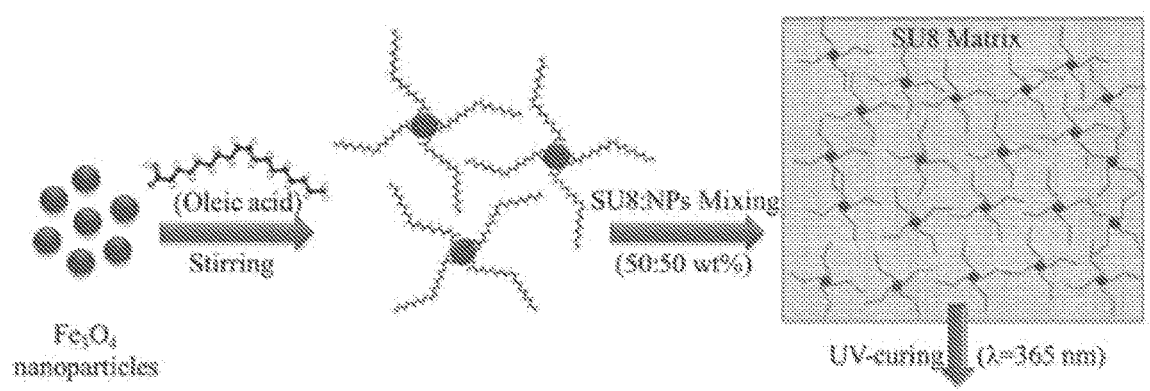
FIG. 9A
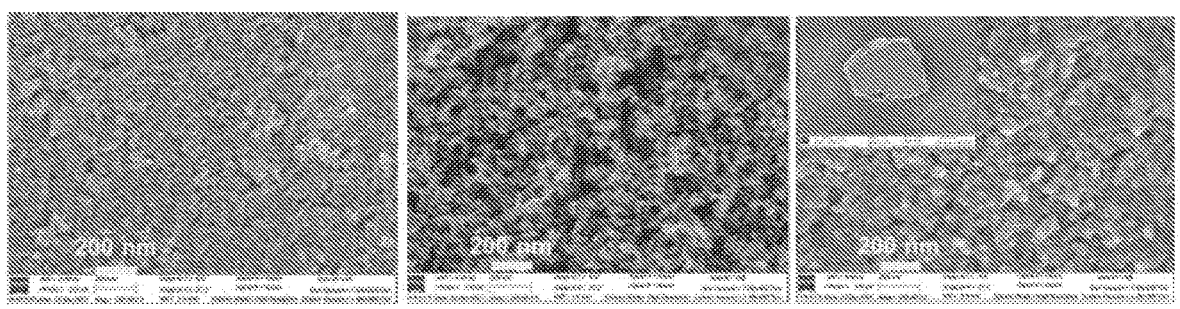
FIG. 9B   FIG. 9C   FIG. 9D
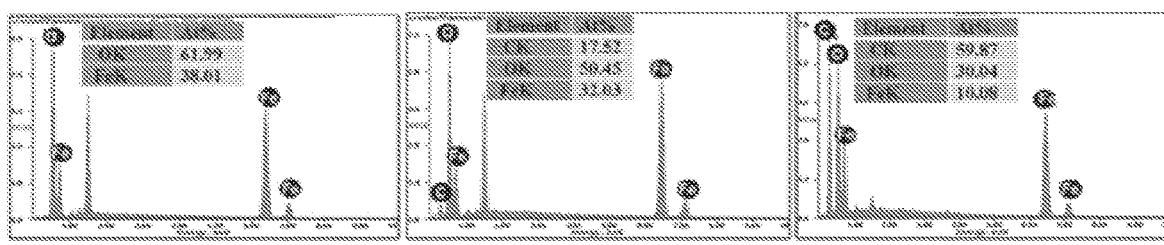
FIG. 9E   FIG. 9F   FIG. 9G

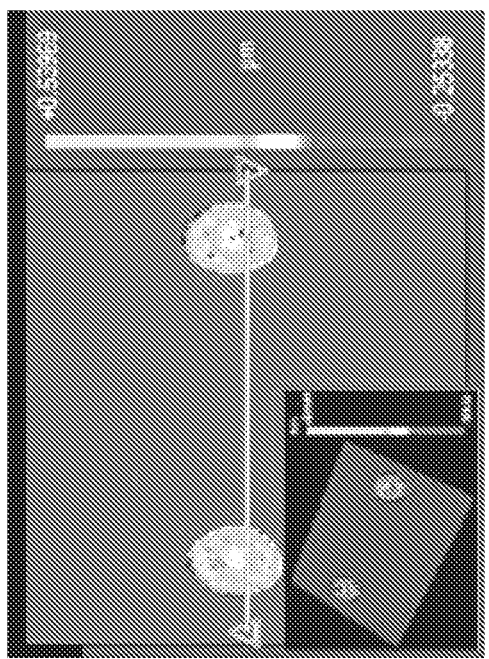
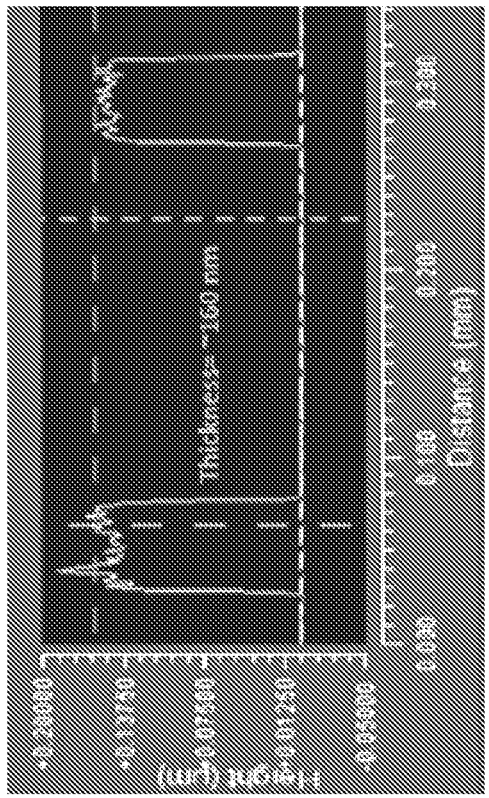
FIG. 16B
FIG. 16A

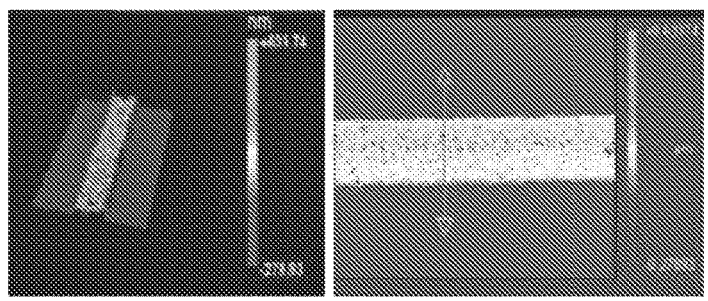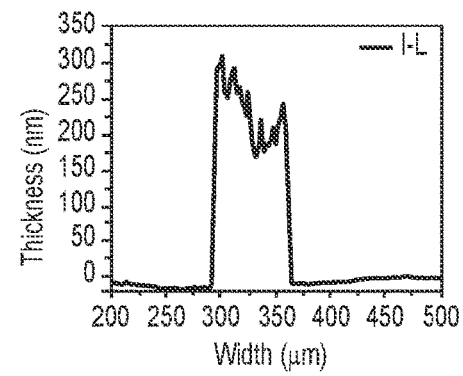
FIG. 17A
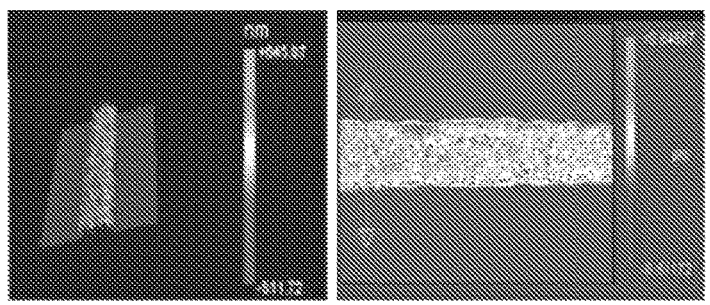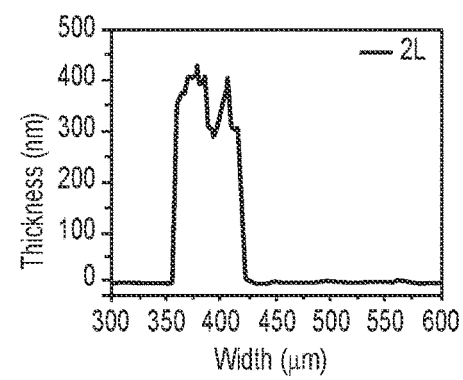
FIG. 17B
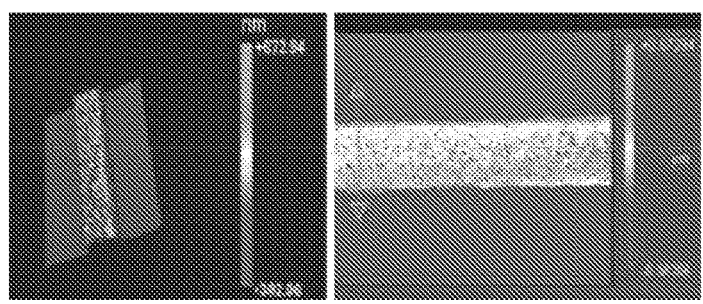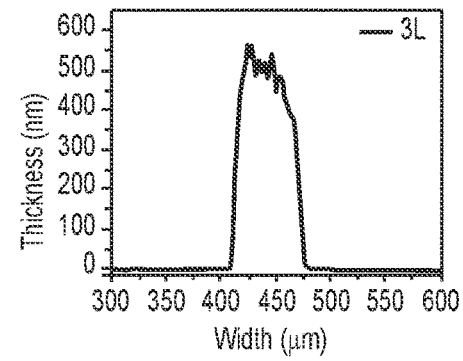
FIG. 17C

IRON OXIDE NANOPARTICLE-BASED MAGNETIC INK FOR ADDITIVE MANUFACTURING

RELATED APPLICATION INFORMATION

This application is a divisional of Ser. No. 16/274,926 filed on Feb. 13, 2019, which claims priority to U.S. Provisional Patent Application Ser. No. 62/742,675 filed on Oct. 8, 2018, and U.S. Provisional Patent Application Ser. No. 62/633,416 filed on Feb. 21, 2018, the disclosure of each of which is incorporated herein by reference in its entirety.

BACKGROUND

As printing technology presents a low-cost, high throughput, and completely digital fabrication process, it is becoming popular with electronics manufacturing. The roll-to-roll manufacturing capability of printing makes it a viable option for mass production to meet the medium to large volume production requirements. Several reports have described the development of conductors, dielectric, and semiconductor inks for transistors, photovoltaic, memory devices, sensors, biological devices, and radio-frequency (RF) electronics. However, there are only a few reports of fully inkjet-printed devices. For fully printed components and devices, different materials inks must be developed since this field is still immature. Fully printed microwave components were recently demonstrated by combining 3D inkjet printing of dielectrics with 2D printing of metallic inks. The next generation of fully printed components and systems should have the ability to control their performance, such that they can be tuned or reconfigured when necessary; this requires the development of functional inks that are magnetic, ferroelectric, or piezoelectric.

In radio-frequency (RF) electronics, tunable or reconfigurable components are becoming important due to the proliferation of new wireless devices, different wireless standards in different parts of the world, and high congestion in the existing bands of wireless communication. Furthermore, magnetic materials have been used effectively for tunable and reconfigurable components such as inductors, antennas, and phase shifters. Recently, many such designs have been shown in multilayer ferrite LTCC (low temperature co-fired ceramic) technology. But, LTCC technology is quite expensive and it will be really neat if the same things can be done through printing technologies. However, there is a paucity of functional inks with magnetic properties and few reports on magnetic ink-printing. For example, one report demonstrated inkjet printing of commercially available, cobalt-based, ferromagnetic nanoparticles (≈200 nm) for the miniaturization of flexible printed inductors. These metallic cobalt nanoparticles usually require surface passivation to avoid the oxidation problem. Another report utilized an interesting approach to align the cobalt nanoparticle ink with an external magnetic field during printing to enable prototyping and development of novel, magnetic, composite materials and components. In another report, inkjet-printed NiZn-ferrite films were described using NiZn-ferrite nanoparticle-based ink, completing its magnetic characterization. All the above inks are metallic in nature, but a magnetic ink with dielectric (insulator) properties is required for tunable RF applications. Though there is a commercial magnetic ink solution available, it has a low concentration (<1 wt %) of iron oxide nanoparticles and is not suitable for these RF applications. Thus, no tunable or reconfigurable, fully printed RF component based on magnetic ink has been reported to date.

SUMMARY

In general, embodiments of the present disclosure describe magnetic ink compositions, methods of making magnetic ink compositions, methods of printing magnetic ink compositions, magnetic substrates based on the magnetic ink compositions for microwave and/or RF devices, printed RF devices, methods of making the microwave and/or RF devices, and the like.

According to one aspect, a magnetic substrate includes cured magnetic ink and a cured polymer resin, wherein the cured magnetic ink includes a plurality of functionalized magnetic iron oxide nanoparticles, and wherein the magnetic substrate is a freestanding magnetic substrate.

According to another aspect, a printed tunable inductor includes one or more layers of cured nanoparticle ink and one or more layers of cured silver organo complex (SOC) based silver ink, wherein the one or more layers of cured nanoparticle ink include magnetic iron oxide nanoparticles, and wherein the printed tunable inductor is sufficient to be tunable in response to an external magnetic field.

According to another aspect, a printed patch antenna includes a printed magnetic substrate, a printed antenna, and a printed metallic ground plane, wherein the printed magnetic substrate includes functionalized iron oxide nanoparticles.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 7A-7B illustrates a surface tension (SFT) measurement of the ink (a) without ethanol and (b) with about 10 vol % ethanol, according to one or more embodiments of the present disclosure.

FIGS. 9A-9G show a) an illustrative diagram of the functionalization of iron oxide nanoparticles and mixing with SU8, with SEM and EDX analysis of b,e) pure iron oxide, c,f) oleic acid functionalized, and d,g) SU8-mixed iron oxide nanoparticles; the inset in (d) is showing low-resolution iron oxide nanoparticles embedded in SU8 matrix, according to one or more embodiments of the present disclosure.

FIGS. 16A-16B are (a) a 2D image of printed dots and its corresponding (b) surface profile, with the inset in (a) showing the 3D view of the printed dots, according to one or more embodiments of the present disclosure.

FIGS. 17A-17C are 3D, 2D and cross-sectional surface profiler images of inkjet-printed iron oxide: (a) single printing, (b) 2 over-layer, and (c) 3 over-layer, according to one or more embodiments of the present disclosure.

DETAILED DESCRIPTION

Figure 1:
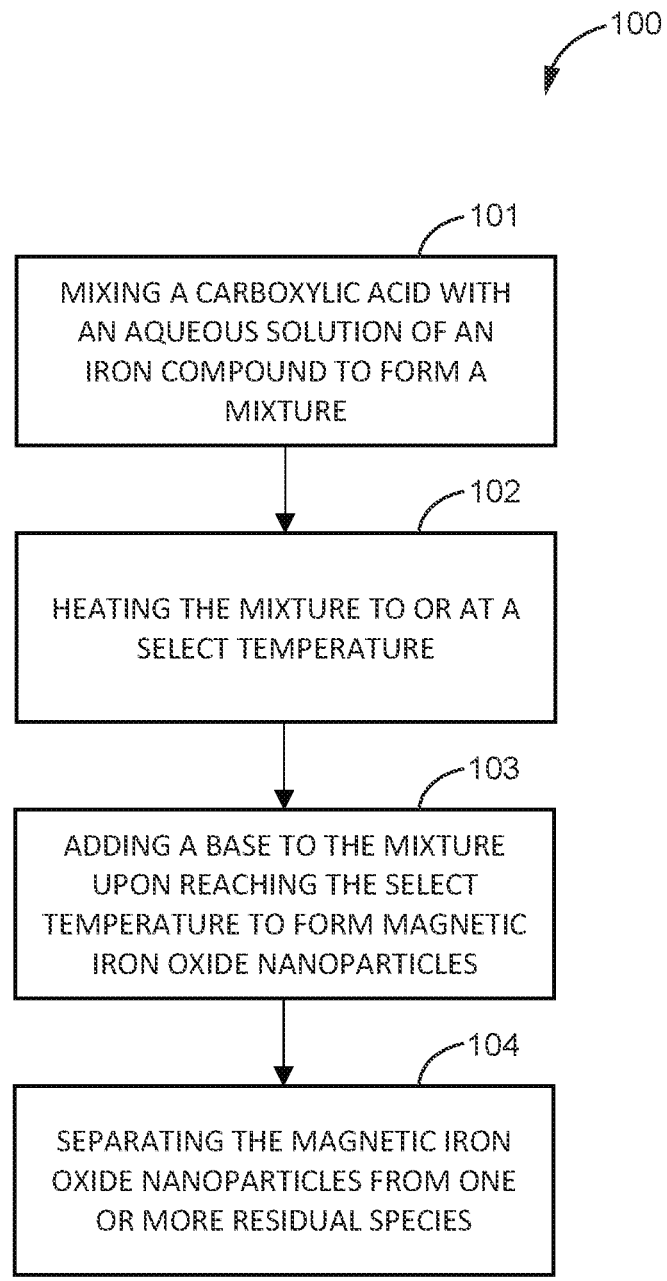
FIG. 1 is a flowchart of a method of making magnetic iron oxide nanoparticles, according to one or more embodiments of the present disclosure.

The invention of the present disclosure relates to magnetic ink compositions. In particular, the invention of the present disclosure relates to magnetic ink compositions containing magnetic iron oxide nanoparticles for a variety of applications, such as printed electronics, among others. For example, the magnetic ink compositions may be used to produce tunable and/or reconfigurable fully-printed RF components and devices, such as inductors, antennas, and phase shifters, among other things. The magnetic ink compositions may be inkjet-printed as magnetic films. The magnetic ink compositions may be mixed with a polymeric resin and printed to form freestanding magnetic substrates. Other components may be printed onto the magnetic films and/or freestanding magnetic substrates to form fully printed, magnetically controlled RF devices.

The magnetic ink compositions may be used to produce fully-printed RF components and devices that may be tuned and/or reconfigured upon application of an external magnetic field. For example, an inductor may be inkjet-printed on top of an inkjet-printed magnetic film to produce a tunable fully-printed inductor. A tuning of about 24% may be observed upon application of an external magnetic field to the tunable fully-printed inductor. An adjustable capacity of greater than about 20% for a fully-printed inductor is unprecedented, as conventional magnetic inks only exhibit about 0.8% tuning. The magnetic ink compositions may be mixed with, for example, a photocurable polymeric resin to form a magnetic substrate with magnetic iron oxide nanoparticles embedded therein. The magnetic substrate may be used to fabricate a linear patch antenna that may be tuned for its frequency upon application of a magnetic field. These are provided as non-limiting examples, as other tunable and reconfigurable fully-printed microwave/RF devices and components may be realized with the magnetic ink compositions.

Definitions

The terms recited below have been defined as described below. All other terms and phrases in this disclosure shall be construed according to their ordinary meaning as understood by one of skill in the art.

As used herein, "adding" refers to any process and/or method of placing one component in or on another component, joining one or more components with another component, and/or bringing two or more components together, as in contacting. The components may be in contact or in immediate/close proximity. Adding may include one or more of pouring, dumping, mixing, depositing, providing, placing, putting, inserting, injecting, introducing, dropping, contacting, and any other methods known in the art.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "heating" refers to increasing to or at a temperature. For example, heating may refer to exposing or subjecting any object, material, etc. at or to a temperature that is greater than a current or previous temperature. Heating may also refer to increasing a temperature of any object, material, etc. to a temperature that is greater than a current or previous temperature of the object, material, etc.

As used herein, "separating" refers to any process of removing a substance from another. The process may employ any technique known in the art suitable for separating. Centrifugation, filtration, and evaporation are examples of separating.

Magnetic Iron Oxide Nanoparticles

FIG. 1 is a flowchart of a method of making magnetic iron oxide nanoparticles, according to one or more embodiments of the present disclosure. As shown in FIG. 1, the method 100 may comprise one or more of the following steps: mixing 101 a carboxylic acid with an aqueous solution of an iron compound to form a mixture; heating 102 the mixture to or at a select temperature; adding 103 a base to the mixture upon reaching the select temperature to form magnetic iron oxide nanoparticles; and separating 104 the magnetic iron oxide nanoparticles from one or more residual species.

The step 101 includes contacting a carboxylic acid with an aqueous solution of an iron compound to form a mixture. In this step, one or more of a carboxylic acid, iron compound, and water are brought into physical contact and/or immediate or close proximity, sequentially and/or simultaneously, in any order. For example, the carboxylic acid may be contacted with, or added to, an aqueous solution containing the iron compound to form the mixture. The contacting of the carboxylic acid to the aqueous solution containing the iron compound may optionally proceed under stirring. The carboxylic acid can be a short chain carboxylic acid having 1-3 carbons and salts thereof. In an embodiment, the carboxylic acid may include one or more of acetic acid, carbonic acid, formic acid, propionic acid, butyric acid, pentanoic acid, and salts thereof. In preferred embodiments, the carboxylic acid includes acetic acid. The iron compound may include any iron salt or hydrated iron salt. For example, the iron compound may include, but is not limited to, one or more of iron (II) chloride, iron (III) chloride, iron (II) fluoride, iron (III) fluoride, iron (II) bromide, iron (III) bromide, iron (II) iodide, iron (III) iodide, iron (II) nitrate, iron (III) nitrate, iron (II) acetate, iron (III) acetate, iron (II) sulfate, iron (III) sulfate, iron (II) oxalate, and iron (III) oxalate. In an embodiment, the iron compound may include one or more iron chlorides, such as one or more of iron (II) chloride and iron (III) chloride. In an embodiment, the iron compound includes iron (II) chloride and iron (III) chloride.

The step 102 includes heating the mixture to or at a select temperature. In this step, the mixture containing the carboxylic acid, iron compound, and water may be heated to or at a select temperature. In an embodiment, the heating of the mixture may proceed slowly. In an embodiment, the heating of the mixture may proceed slowly, optionally under stirring. The select temperature may range from about 50° C. to about 120° C. In preferred embodiments, the select temperature is about 90° C.

The step 103 includes adding a base to the mixture upon reaching the select temperature to form magnetic iron oxide nanoparticles. In this step, once the mixture is heated to or at about the select temperature, such as about 90° C., the base may be added to the mixture. The base may include any suitable base, such as metal hydroxides, metal oxides, metal alkoxides, ammonia, and derivatives thereof. For example, in an embodiment, the base is sodium hydroxide. In an embodiment, the addition of the base to the mixture may result in a black colloidal solution. The presence of the carboxylic acid and the addition of the base upon reaching about the select temperature may facilitate the formation of small magnetic iron oxide nanoparticles suitable for the magnetic ink composition. The higher temperatures may increase the reaction rate such that large amounts of nuclei are formed in a short period of time, leading to the formation of small nanoparticles. For example, the base and carboxylic acid may, under the reaction conditions, disassociate or break the precipitates for the formation of uniform and/or disperse iron oxide nanoparticles. In some embodiments, the mixture may, upon adding the base, be refluxed for a period of time (e.g., about 10-15 minutes).

The step 104 is optional and includes separating the magnetic iron oxide nanoparticles from one or more residual species. In this step, the solution of magnetic iron oxide nanoparticles may be centrifuged, optionally followed by washing with one or more solvents, such as water and an alcohol (e.g., ethanol) to obtain the iron oxide nanoparticles.

Iron-Oxide Nanoparticle-Based Magnetic Ink Compositions

Embodiments of the present disclosure describe an ink composition comprising a plurality of magnetic iron oxide nanoparticles in a solution containing one or more of a carrier (e.g., solvent) and a surface tension adjusting agent. In an embodiment, the plurality of magnetic iron oxide nanoparticles may be dispersed and/or suspended in the solution containing one or more of the carrier and the surface tension adjusting agent. For example, in an embodiment, the plurality of magnetic iron oxide nanoparticles may be uniformly (e.g., substantially uniformly) dispersed, suspended, and/or mixed in the solution containing one or more of the carrier and the surface tension adjusting agent.

The plurality of magnetic iron oxide nanoparticles may include any suitable iron oxide nanoparticle with magnetic properties. In an embodiment, the plurality of magnetic iron oxide nanoparticles may include magnetic iron oxide nanoparticles prepared according to any of the methods described herein. In an embodiment, the plurality of magnetic iron oxide nanoparticles include one or more of $Fe_3O_4$ nanoparticles and $Fe_2O_3$ nanoparticles. In an embodiment, the plurality of magnetic iron oxide nanoparticles include $Fe_3O_4$ nanoparticles. In an embodiment, the plurality magnetic iron oxide nanoparticles include $Fe_2O_3$ nanoparticles. The plurality of magnetic iron oxide nanoparticles may be uniform (e.g., substantially uniform) in size and/or shape, such as spherical, cubic, and/or elongated. An average diameter of the plurality of magnetic iron oxide nanoparticles may range from about 1 nm to about 50 nm. In an embodiment, an average diameter of the plurality of magnetic iron oxide nanoparticles may range from about 15 nm to about 20 nm. In other embodiments, the average diameter may be less than about 1 nm and/or greater than about 50 nm. A concentration/loading of the magnetic iron oxide nanoparticles may be greater than or equal to about 1 wt %. In an embodiment, a concentration/loading of the magnetic iron oxide nanoparticles may be about 10 wt %.

The carrier may include any carrier suitable for dispersing, suspending, and/or mixing the magnetic iron oxide nanoparticles. For example, in an embodiment, the carrier includes water. In an embodiment, the carrier includes deionized water. In an embodiment, the carrier includes water-compatible solvents, which may include, but are not limited to, alcohol (e.g., ethanol, methanol, propanol), glycol (ethylene glycol, 1,2-Butanediol, 1,3-Butanediol, 1,4-Butanediol, 1,3-Propanediol, 1,5-Pentanediol, propylene glycol, triethylene glycol, glycerol), and other such solvents. The surface tension adjusting agent may optionally be included to adjust a surface tension of the ink composition and/or providing stable jetting performance. In an embodiment, the surface tension adjusting agent includes an alcohol. For example, the surface tension adjusting agent may include one or more of methanol, ethanol, propanol, Triton X-100, centrimonium bromide (CTAB), sodium dodecyl sulfate (SDS), and other such agents. In an embodiment, the surface tension adjusting agent is ethanol. The alcohol is provided as an example of a suitable surface tension adjusting agent and shall not be limiting as any suitable surface tension adjusting agent known in the art may be used herein.

Figure 2:
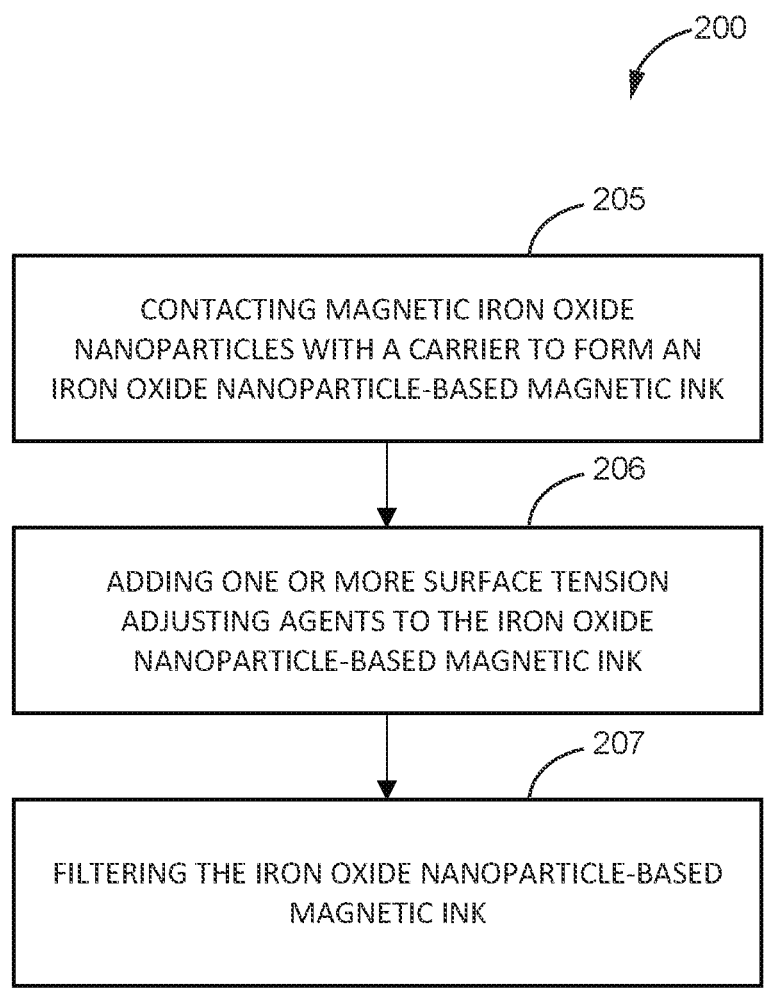
FIG. 2 is a flowchart of a method of making a magnetic ink composition, according to one or more embodiments of the present disclosure.

FIG. 2 is a flowchart of a method of making a magnetic ink composition, according to one or more embodiments of the present disclosure. The method 200 may comprise one or more of the following steps: contacting 205 magnetic iron oxide nanoparticles with a carrier to form an iron oxide nanoparticle-based magnetic ink; adding 206 one or more surface tension adjusting agents to the iron oxide nanoparticle-based magnetic ink; and filtering 207 the iron oxide nanoparticle-based magnetic ink.

The step 205 includes contacting magnetic iron oxide nanoparticles with a suitable carrier to form an iron oxide nanoparticle-based magnetic ink. In this step, the magnetic iron oxide nanoparticles may be brought into physical contact and/or immediate or close proximity to the one or more carriers sufficient to form the iron oxide nanoparticle-based magnetic ink. The contacting may be sufficient to disperse, suspend, and/or mix the magnetic iron oxide nanoparticles in the carrier. The contacting may optionally proceed under stirring. A content of the magnetic iron oxide nanoparticles may generally be greater than about 0 wt %. For example, in an embodiment, a content of the magnetic iron oxide nanoparticles may be greater than about 1 wt %. In an embodiment, a content of the magnetic iron oxide nanoparticles may be about 10 wt % or greater. The magnetic iron oxide nanoparticles may include any of the magnetic iron oxide nanoparticles prepared according to the methods of or described in the present disclosure.

The carrier may include any of the carriers of the present disclosure. For example, in an embodiment, the carrier includes water. In an embodiment, the carrier includes deionized water. The amount of carrier used in this step may be varied in order to adjust a viscosity of the iron oxide nanoparticle-based magnetic ink, which may depend on the concentration of the magnetic iron oxide nanoparticles. For example, in an embodiment, the amount of carrier may be increased (e.g., added to the ink) to reduce a viscosity. In an embodiment, the amount of carrier may be decreased (e.g., removed by evaporation, etc.) to increase a viscosity. In an embodiment, the viscosity can be adjusted by adding a viscofier, such as HEC, 2-HEC, 2,3-butanediol, glycerol, ethylene glycol, and combinations thereof. The viscosity may be less than about 20 cP. In many embodiments, the viscosity may be less than about 12.5 cP. For inkjet printing, the viscosity may range from about 1-10 cps. For example, in preferred embodiments, the viscosity may be about 2 cP.

The step 206 is optional and includes adding one or more surface tension adjusting agents to the iron oxide nanoparticle-based magnetic ink. The adding may proceed by contacting. In an embodiment, the adding may optionally proceed under stirring. For example, a duration of the stirring may range from about 1 min to about 48 h. In an embodiment, a duration of the stirring may be about 24 h. Any of the surface tension adjusting agents of the present disclosure may be used herein. For example, in an embodiment, the surface tension adjusting agents include one or more alcohols, such as methanol, ethanol, and/or propanol. In an embodiment, the surface tension adjusting agents include ethanol. The surface tension adjusting agents may be added to the iron oxide nanoparticle-based magnetic ink to adjust the surface tension of the ink to a suitable range, such as a range suitable for stable jetting performance. For example, the surface tension of the iron oxide nanoparticle-based magnetic ink may range from about 20 to about 350 mN $m^{-1}$. In many embodiments, the surface tension may range from about 40 to about 65 mN $m^{-1}$. In preferred embodiments, the surface tension may be about 44 mN $m^{-1}$.

The step 207 is optional and includes filtering the iron oxide nanoparticle-based magnetic ink. In this step, the iron oxide nanoparticle-based magnetic ink may be subjected to filtration to separate oversized particle aggregates. In an embodiment, it may be desirable to subject the iron oxide nanoparticle-based magnetic ink to filtration in order to avoid clogging and/or blockage during jetting and/or printing. Oversized particle aggregates may be defined according to the printing application and/or apparatus used for printing. In some embodiments, oversized particle aggregates include particle aggregates greater than about 450 nm in size. For example, 0.45 µm polypropylene Whatman paper may be used for the filtering. These shall not be limiting as other techniques known in the art suitable for filtering may be used herein.

Figure 3:
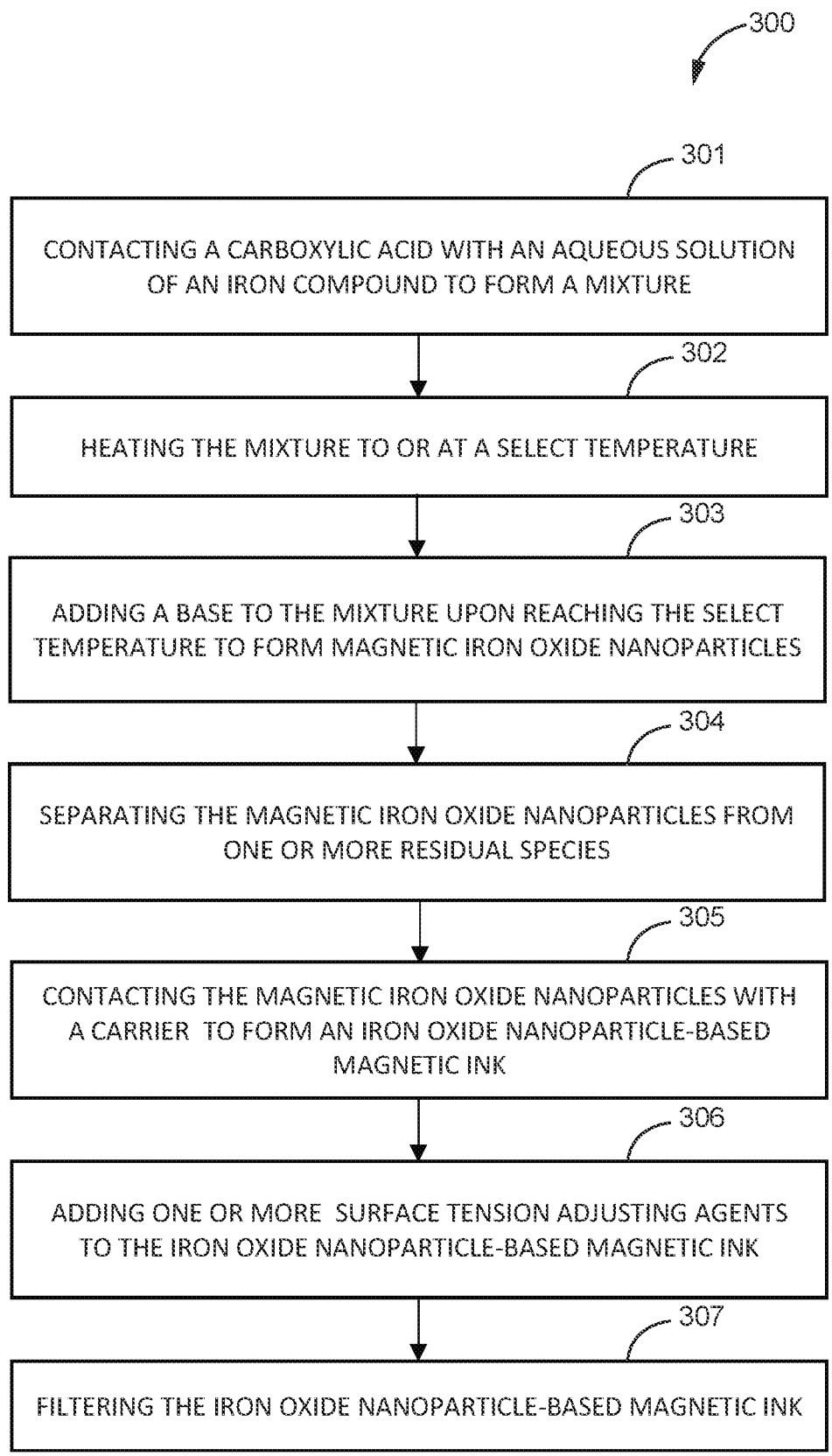
FIG. 3 is a flowchart of a method of making a magnetic ink composition, according to one or more embodiments of the present disclosure.

FIG. 3 is a flowchart of a method of making a magnetic ink composition, according to one or more embodiments of the present disclosure. As shown in FIG. 3, the method 300 may comprise one or more of the following steps: contacting 301 a carboxylic acid with an aqueous solution of an iron compound to form a mixture; heating 302 the mixture to or at a select temperature; adding 303 a base to the mixture upon reaching the select temperature to form magnetic iron oxide nanoparticles; separating 304 the magnetic iron oxide nanoparticles from one or more residual species; contacting 305 the magnetic iron oxide nanoparticles with a carrier to form an iron oxide nanoparticle-based magnetic ink; adding 306 one or more surface tension adjusting agents to the iron oxide nanoparticle-based magnetic ink; and filtering 307 the iron oxide nanoparticle-based magnetic ink.

In an embodiment, the method may comprise one or more of the following steps: mixing acetic acid with an aqueous solution of iron (II) chloride and/or iron (III) chloride to form a mixture, heating the mixture to or at a select temperature, wherein the select temperature is about 90° C., adding sodium hydroxide to the mixture upon reaching the select temperature to form magnetic iron oxide nanoparticles, separating the magnetic iron oxide nanoparticles from one or more residual species, and dispersing the magnetic iron oxide nanoparticles in deionized water to form an iron oxide nanoparticle-based magnetic ink.

Printing Iron-Oxide Nanoparticle-Based Magnetic Ink Compositions

Figure 4:
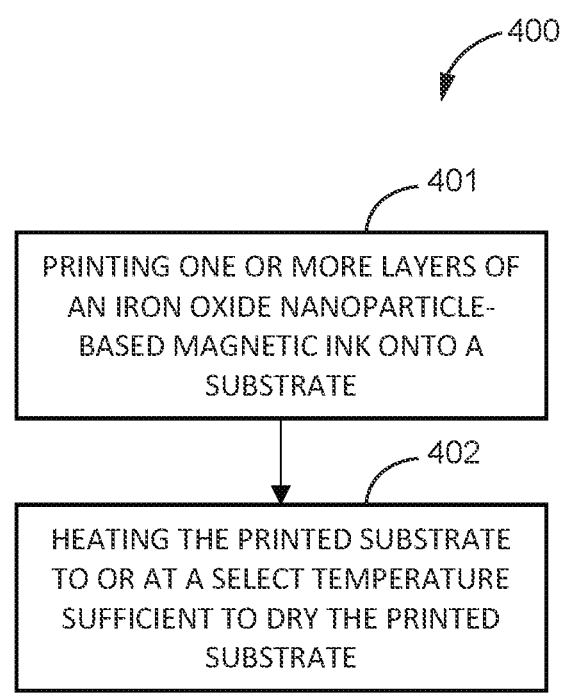
FIG. 4 is a flowchart of a method of printing a magnetic ink composition, according to one or more embodiments of the present disclosure.

FIG. 4 is a method of printing a magnetic ink composition, according to one or more embodiments of the present disclosure. As shown in FIG. 4, the method 400 may comprise printing 401 one or more layers of an iron oxide nanoparticle-based magnetic ink onto a substrate; and heating 402 the printed substrate to or at a select temperature sufficient to dry the printed substrate. Any of the iron oxide nanoparticle-based magnetic inks of the present disclosure may be used herein. The method may be used to form, among other things, magnetic substrates including a magnetic film on a surface of a substrate, wherein the magnetic film includes magnetic iron oxide nanoparticles.

The step 401 includes printing one or more layers of an iron oxide nanoparticle-based magnetic ink on a substrate. In many embodiments, the printing includes inkjet printing. For example, the printing may proceed by ejecting one or more droplets of the magnetic ink from a suitable printer, such as a 2D printer and/or 3D printer, onto the substrate in any form or pattern, such as dots and/or lines. In an embodiment, the printing may proceed by vertically dropping or ejecting droplets of the magnetic ink. In an embodiment, the printer may include a drop-on-demand piezoelectric ink-jet nozzle. The printing may proceed continuously (e.g., substantially continuously) or non-continuously (e.g., substantially non-continuously), optionally under constant printing conditions.

The printing may include printing at least one layer of the iron oxide nanoparticle-based magnetic ink on the substrate. In many embodiments, the printing may include printing at least about 2 overlayers, preferably about 5 overlayers, of the iron oxide nanoparticle-based magnetic ink to, for example, achieve a uniform or substantially uniform density of the nanoparticles. The number of layers of the iron oxide nanoparticle-based magnetic ink printed on the substrate may be selected to achieve a desired thickness. For example, a thickness of the iron oxide nanoparticle-based magnetic ink may be increased by increasing the number of printed layers and/or decreased by decreasing the number of printed layers. In addition or in the alternative, the drop spacing may be adjusted to achieve a desired thickness of the printed lines. The printed magnetic ink may not exhibit any coffee-ring effects and/or line bulging.

The printing and/or ejection of ink may be characterized by, among other things, one or more of a drop volume, jetting velocity of ejected droplets, cartridge print height, and drop spacing. In an embodiment, the drop volume may be about 10 pL. In an embodiment, the jetting velocity of ejected droplets may be about 3.3 m s$^{-1}$. In an embodiment, the cartridge print height may be about 0.3 mm. In an embodiment, the drop spacing may be about 40 µm. In other embodiments, one or more of the drop volume, jetting velocity of ejected droplets, cartridge print height, and drop spacing may be greater or less than the values described herein.

The substrate may include any suitable substrate for printing the iron oxide nanoparticle-based magnetic ink. For example, the substrate may include one or more of PI, PET, PEN, glass, and other 3-D printed substrates, such as those formed from acrylic and/or molten plastic (acrylonitrile butadiene styrene (ABS), polylactic acid (PLA), etc.) based materials. In an embodiment, the substrate is glass.

The step 402 includes heating the printed substrate to or at a select temperature sufficient to dry the printed substrate. In this step, the printed substrate is treated by heating the printed substrate and/or an environment in which the printed substrate is present to or at a select temperature sufficient to solidify and/or dry the iron oxide nanoparticle-based magnetic ink. In many embodiments, the select temperature is about 80° C. In other embodiments, the select temperature may be less than or greater than about 80° C. The heating may proceed for any duration suitable for drying and/or solidifying the printed iron oxide nanoparticle-based magnetic ink.

Fully/Partially Printed Tunable/Reconfigurable RF Devices/Components Based on the Iron Oxide Nanoparticle-Based Magnetic Inks The iron oxide nanoparticle-based magnetic inks of the present disclosure may be printed according to the methods of the present disclosure and incorporated into tunable and/or reconfigurable RF devices and/or components. The RF devices and/or components may be fully and/or partially printed (e.g., inkjet printed).

In an embodiment, the tunable and/or reconfigurable RF devices and/or components are fully printed to form a fully printed tunable inductor. For example, embodiments of the present disclosure describe a tunable and/or reconfigurable inductor including the printed iron oxide nanoparticle-based magnetic ink, which may be printed as a film, among other forms, according to the methods of the present disclosure. In an embodiment, a tunable inductor may be fabricated on a top of an inkjet-printed magnetic film prepared from the iron oxide nanoparticle-based magnetic inks of the present disclosure. For example, the iron oxide nanoparticle-based magnetic ink may be inkjet printed on a substrate, such as a plastic substrate, with one or more overprinted layers and then dried via heating at about 80° C. for about 30 min to form a printed magnetic film. After printing the magnetic film, a tunable inductor may be printed on the inkjet printed film. For example, in an embodiment, one or more layers of silver-organo-complex (SOC) based silver ink may be printed and cured (e.g., using infrared (IR) heating) to obtain a fully printed tunable inductor. Optionally, the fully printed tunable inductor may be supported on any suitable substrate, such as FR-4 board.

Functionalized Iron Oxide Nanoparticle-Based Magnetic Ink Compositions

Embodiments of the present disclosure further describe an ink composition comprising a mixture containing one or more of a plurality of functionalized magnetic iron oxide nanoparticles, a photocurable polymeric resin, and a solvent. The magnetic iron oxide nanoparticles may include any of the magnetic iron oxide nanoparticles of the present disclosure. For example, in an embodiment, the magnetic iron oxide nanoparticles may include one or more of $Fe_3O_4$ nanoparticles and $Fe_2O_3$ nanoparticles. The photocurable polymeric resin and the solvent may include any suitable polymer with photocurable capabilities dissolved in a suitable solvent, such as an organic solvent. For example, in an embodiment, the photocurable polymeric resin may include SU8, an epoxy dissolved in organic solvents, such as cyclopentanone. The SU8 may be cross-linked through polymerization by UV exposure to make solid films (e.g., thick solid films). In many embodiments, the photocurable polymeric resin may be present in low amounts (e.g., with a low wt %) and/or with a low viscosity solvent composition. The photocurable polymeric resin may be solidified (e.g., immediately solidified) upon exposure to, for example, ultraviolet light, among other wavelengths of light. The photocurable polymer resin may include UV-curable resins based on acrylated epoxies, acrylated polyesters, acrylated urethanes, acrylated silicones, and other such resins.

The magnetic iron oxide nanoparticles should be compatible with the polymer and solvent of the photocurable polymeric resin such that it may be incorporated into and/or embedded in the matrix. To be compatible with the photocurable polymeric resins, the magnetic iron oxide nanoparticles may be functionalized such that the magnetic iron oxide nanoparticles may be combined with one or more of the photocurable polymeric resins. The magnetic iron oxide nanoparticles may be functionalized with any element or compound suitable for embedding the nanoparticles in the photocurable polymeric resin. For example, in many embodiments, the magnetic iron oxide nanoparticles may be functionalized with oleic acid, which is compatible with a large number of organic solvents, including, for example, cyclopentanone. The oleic acid may be physically sorbed (e.g., adsorbed) onto a surface of the magnetic iron oxide nanoparticles such that the long chain of the oleic acid may interact with the organic solvent. In other embodiments, the magnetic iron oxide nanoparticles may be functionalized with one or more of oleic acid, elaidic acid, oleylamine, oleamide, and oleyl alcohol.

Figure 5:
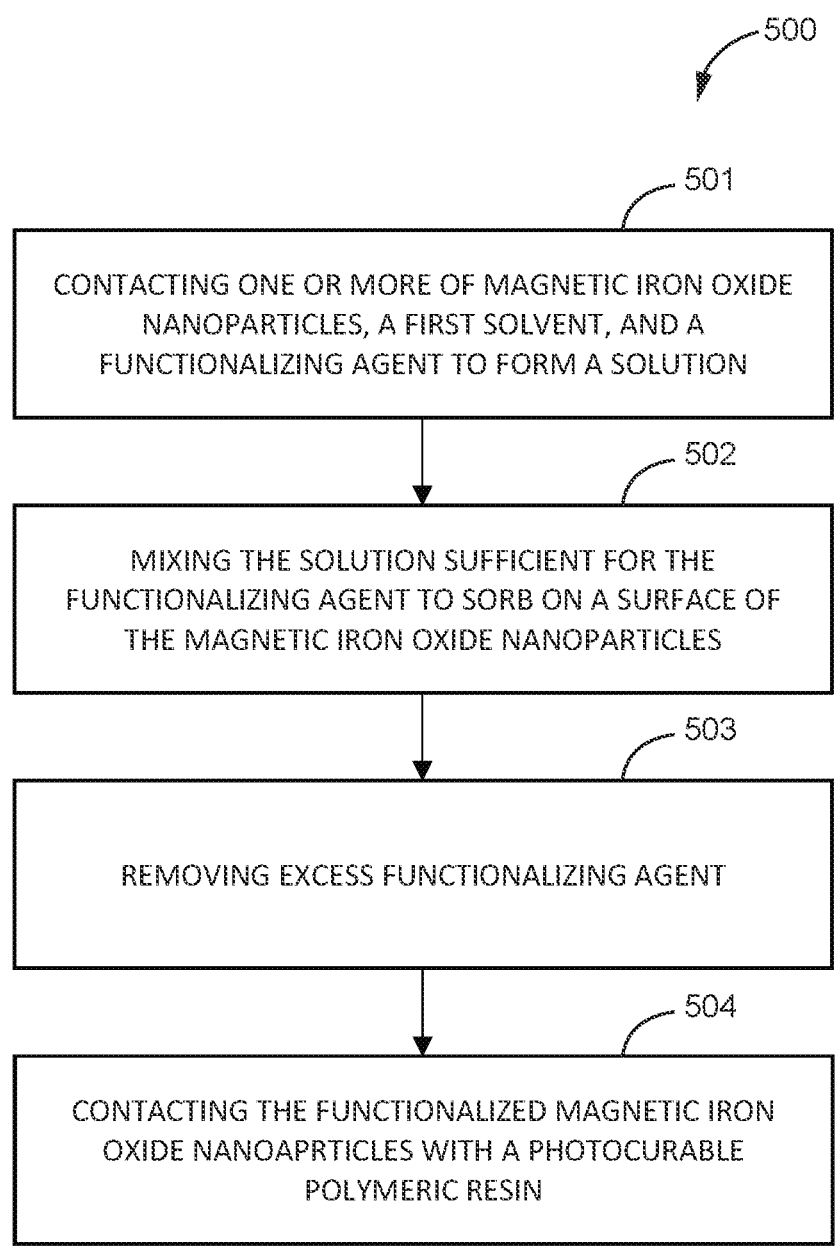
FIG. 5 is a flowchart of a method of functionalizing magnetic iron oxide nanoparticles, according to one or more embodiments of the present disclosure.

FIG. 5 is a flowchart of a method of making functionalized iron oxide nanoparticle-based magnetic ink compositions, according to one or more embodiments of the present disclosure. As shown in FIG. 5, the method may comprise one or more of the following steps: contacting 501 one or more of magnetic iron oxide nanoparticles, a first solvent, and a functionalizing agent to form a solution; mixing 502 the solution sufficient for the functionalizing agent to sorb on a surface of the magnetic iron oxide nanoparticles; removing 503 excess functionalizing agent; and contacting 504 the functionalized magnetic iron oxide nanoparticles with a photocurable polymeric resin to form a functionalized iron oxide nanoparticle-based magnetic ink.

The step 501 includes contacting one or more of magnetic iron oxide nanoparticles, a first solvent, and a functionalizing agent to form a solution. The contacting may proceed by bringing one or more of the magnetic iron oxide nanoparticles, first solvent, and functionalizing agent into physical contact and/or immediate or close proximity, sequentially and/or simultaneously, in any order. In an embodiment, the magnetic iron oxide nanoparticles may be dispersed in the first solvent, followed by addition of the functionalizing agent. The magnetic iron oxide nanoparticles may include any of the magnetic iron oxide nanoparticles of the present disclosure, either in dry or wet form, preferably wet form. The first solvent may include any solvent suitable for dispersing and/or functionalizing the magnetic iron oxide nanoparticles. For example, the first solvent may include an alcohol solvent, such as ethanol, methanol, propanol, butanol, pentanol, and other such solvents. The functionalizing agent may include any functionalizing agent compatible with a desired solvent, such as solvents in which the photocurable polymeric resin is dissolved (e.g., organic solvents). For example, the functionalizing agent may include one or more of oleic acid, elaidic acid, oleylamine, oleamide, and oleyl alcohol.

The step 502 includes mixing the solution sufficient for the functionalizing agent to sorb on a surface of the magnetic iron oxide nanoparticles. The mixing may include any technique sufficient for the functionalizing agent to sorb onto a surface of the magnetic iron oxide nanoparticles. For example, the mixing may be achieved by stirring, among other techniques known in art, for a select duration. The duration of the mixing may range from about 1 min to about 48 h. In an embodiment, the duration of the mixing is about 24 h. The functionalizing agent may be physically and/or chemically sorbed (e.g., absorbed and/or adsorbed) onto a surface of the magnetic iron oxide nanoparticles. In many embodiments, the functionalizing agent may be physically absorbed onto a surface of the magnetic iron oxide nanoparticles such that the functionalizing agent is available to interact with the desired solvent (e.g., the solvent in which the photocurable polymeric material is dissolved). In this way, the functionalized iron oxide nanoparticles may be compatible with the photocurable polymeric resin matrix.

The step 503 is optional and includes removing excess functionalizing agent, if necessary. In this step, it may be desirable to remove, among other things, excess functionalizing agent from the mixture, which may contain one or more of functionalized magnetic iron oxide nanoparticles, magnetic iron oxide nanoparticles, first solvent, and functionalizing agent. The removing may include one or more of centrifuging and washing with a solvent, such as ethanol. For example, in an embodiment, the mixture may be centrifuged (e.g., at about 4000 rpm for about 2 min) and washed with ethanol about 2-3 times to remove any excess oleic acid. In an embodiment, the removing may further comprise removing one or more of magnetic iron oxide nanoparticles, first solvent, and functionalizing agent to, for example, obtain functionalized magnetic iron oxide nanoparticles.

The step 504 includes contacting the functionalized magnetic iron oxide nanoparticles with a photocurable polymeric resin to form a functionalized iron oxide nanoparticle-based magnetic ink. Any of the photocurable polymer resins of the present disclosure may be used herein. In an embodiment, the photocurable polymeric resin may be dissolved in a second solvent, such as organic solvents (e.g., cyclopentanone). In an embodiment, one or more of magnetic iron oxide nanoparticles, first solvent, and functionalizing agent may be present during the contacting. In an embodiment, one or more of magnetic iron oxide nanoparticles, solvent, and functionalizing agent may not be present during the contacting. The contacting may proceed by bringing the functionalized magnetic iron oxide nanoparticles, photocurable polymeric resin, and second solvent into physical contact and/or immediate or close proximity. For example, in an embodiment, the contacting may proceed by mixing using stone mortar and pestle. The functionalized magnetic iron oxide nanoparticles and photocurable polymeric resin may be mixed at a 1:100 wt % ratio to a 100:1 wt % ratio. In an embodiment, the functionalized magnetic iron oxide nanoparticles and photocurable polymeric resin may be mixed at a 50:50 wt % ratio. In an embodiment, the functionalized iron oxide nanoparticle-based magnetic ink may be in a form of an ink paste.

Printing Functionalized Iron Oxide Nanoparticle-Based Magnetic Inks

Figure 6:
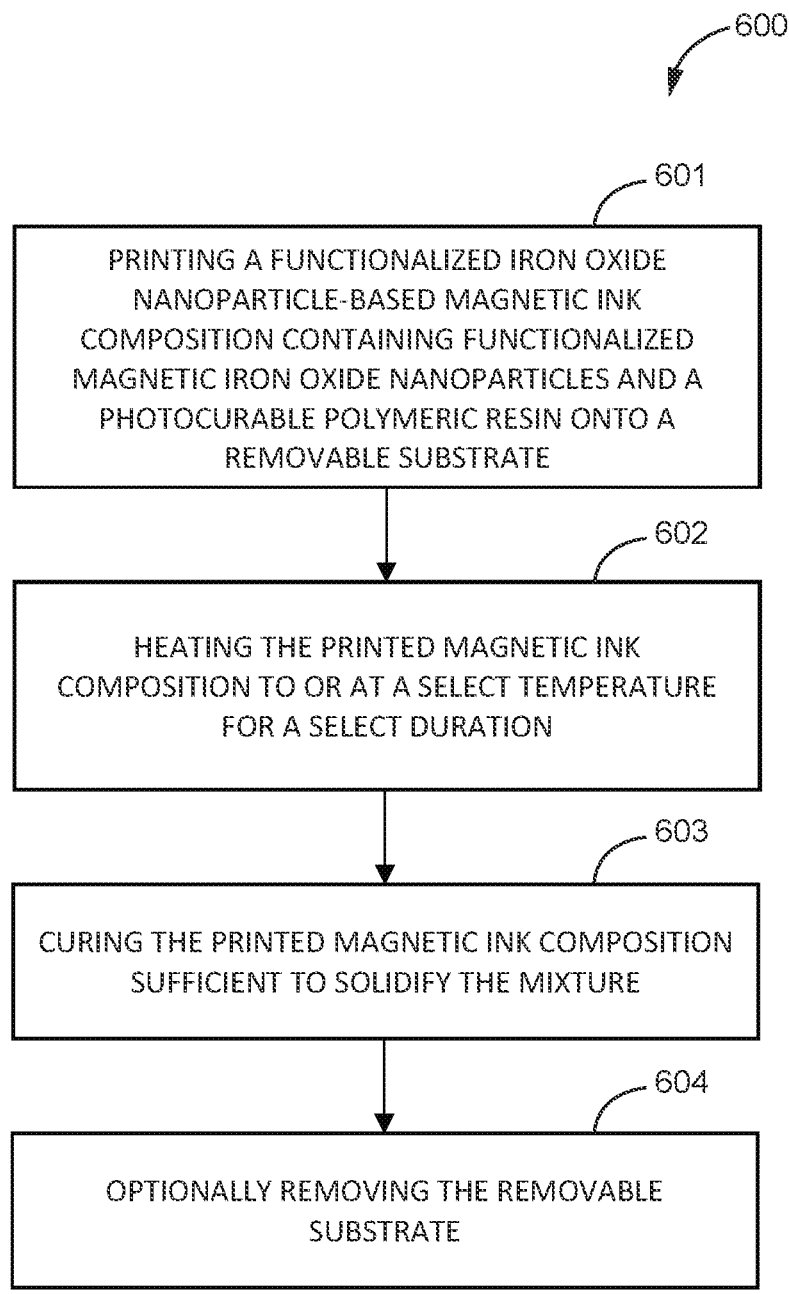
FIG. 6 is a flowchart of a method of printing a magnetic ink composition, according to one or more embodiments of the present disclosure.

FIG. 6 is a flowchart of a method of printing a magnetic ink composition, according to one or more embodiments of the present disclosure. As shown in FIG. 6, the method 600 may comprise printing 601 a functionalized iron oxide nanoparticle-based magnetic ink composition containing functionalized magnetic iron oxide nanoparticles and a photocurable polymeric resin onto a removable substrate, heating 602 the printed magnetic ink composition to or at a select temperature for a select duration, curing 603 the printed magnetic ink composition sufficient to solidify the mixture; and optionally removing 604 the removable substrate. The method may be used to form, among other things, freestanding magnetic substrates including magnetic iron oxide nanoparticles embedded in a polymeric material. The freestanding magnetic substrates formed according to the methods of the present disclosure may be used to form tunable, fully printed microwave or RF devices, among other things.

The step 601 includes printing a functionalized iron oxide nanoparticle-based magnetic ink onto a removal substrate. The functionalized iron oxide nanoparticle-based magnetic ink may include any of the magnetic ink compositions of the present disclosure. For example, in an embodiment, the functionalized iron oxide nanoparticle-based magnetic ink may contain one or more of functionalized magnetic iron oxide nanoparticles and a photocurable polymeric resin. In an embodiment, the functionalized iron oxide nanoparticle-based magnetic ink may further contain one or more residual species, such as one or more of magnetic iron oxide nanoparticles, solvent, and functionalizing agent. The removable substrate may be used as a support until the magnetic substrate is solidified (e.g., after curing). For example, the removable substrate may include an FR-4 board with sacrificial paper on a backside. This shall not be limiting as any other material known in the art may be used as a removable substrate.

Depending on a viscosity of the magnetic ink composition, the magnetic ink composition may be provided in the form of a paste. In an embodiment, a slot may be created on the removable substrate to facilitate printing of the magnetic ink composition to achieve a desired magnetic substrate thickness. In an embodiment, the printing may proceed by a manual screen-printing technique, such as a squeegee, to print the magnetic ink paste on the removable substrate. For example, the magnetic ink paste may be printed by filling (e.g., pouring, depositing, dropping, applying, etc.) the slot created on the removable substrate with the magnetic ink paste, optionally with the use of a squeegee or other similar instrument. Any thickness of the magnetic substrate to be formed may be achieved by varying a depth of the slot.

The step 602 includes heating the printed magnetic ink composition to or at a select temperature for a select duration. The heating may include heating the printed magnetic ink composition and/or an environment in which the printed magnetic ink composition is present to or at the select temperature. The select temperature may include any suitable temperature. In many embodiments, the select temperature may be about 80° C. In other embodiments, the select temperature may be less than about and/or greater than about 80° C. The select duration may include any suitable duration. In many embodiments, the select duration may be about 15 min. In other embodiments, the select duration may be less than or more than about 15 min.

The step 603 includes curing the printed magnetic ink composition sufficient to solidify the mixture and obtain, for example, a freestanding magnetic substrate. The curing may include any wavelength of light, which may depend on the selection of the photocurable polymeric resin. In some embodiments, the curing may include ultraviolet (UV) and/or infrared (IR) curing. The curing may proceed for any suitable time, such as about 15 minutes. The freestanding magnetic substrate may include functionalized iron oxide nanoparticles embedded in the polymeric matrix. In an embodiment, a fully inkjet-printed linear patch antenna including the freestanding magnetic substrates of the present disclosure In some embodiments, steps 601 to 603 may proceed one or more times. For example, the slot created in the removable substrate may be filled with the magnetic ink paste in one or more cycles, wherein in each cycle, the ink is printed 601, heated 602, and cured 603. The step 604 is optional and includes removing the removable substrate. The removing may include one or more of cutting the removable substrate from the edges and/or immersing the removable substrate in a warm bath, such as a warm water bath (e.g., for about 10 min).

Fully/Partially Printed Tunable/Reconfigurable RF Devices/Components Based on the Iron Oxide Nanoparticle-Based Magnetic Inks The functionalized iron oxide nanoparticle-based magnetic inks of the present disclosure may be printed according to the methods of the present disclosure and incorporated into tunable and/or reconfigurable devices and/or components. The RF devices and/or components may be fully and/or partially printed.

In an embodiment, the functionalized iron oxide nanoparticle-based magnetic inks are fully printed to form tunable and reconfigurable passive microwave components. For example, embodiments of the present disclosure describe printed linear patch antennas including the functionalized iron oxide nanoparticle-based magnetic ink described herein and which may be printed as freestanding magnetic substrates according to the methods of the present disclosure. In an embodiment, a smoothening layer may be inkjet printed and cured on a top and bottom surface of the freestanding magnetic substrate. In an embodiment, one or more layers of a silver-organo-complex (SOC) silver ink may be printed and cured using, for example, IR heating to obtain the patch antenna. The SOC ink is more fully described in WO 2017/103797 A1, which is hereby incorporated by reference in its entirety.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

The field of printed electronics is still in its infancy and most of the reported work is based on commercially available nanoparticle-based metallic inks. Although fully printed devices that employ dielectric/semiconductor inks have recently been reported, there is a dearth of functional inks that can demonstrate controllable devices. The lack of availability of functional inks is a barrier to the widespread use of fully printed devices. For radio-frequency electronics, magnetic materials have many uses in reconfigurable components, but rely on expensive and rigid ferrite materials. A suitable magnetic ink can facilitate the realization of fully printed, magnetically controlled, tunable devices.

The present Example describes the development of an iron oxide nanoparticle-based magnetic ink. First, a tunable inductor was fully printed using iron oxide nanoparticle-based magnetic ink. Furthermore, iron oxide nanoparticles were functionalized with oleic acid to make them compatible with a UV-curable SU8 solution. Functionalized iron oxide nanoparticles were successfully embedded in the SU8 matrix to make a magnetic substrate. The as-fabricated substrate was characterized for its magnetostatic and microwave properties. A frequency tunable printed patch antenna was demonstrated using the magnetic and in-house silver-organo-complex inks. This was a step toward low-cost, fully printed, controllable electronic components.

The iron oxide nanoparticle-based magnetic ink was completely characterized for its material properties, and then its utility was demonstrated through fully printed, magnetically controllable RF devices. A simple solution method to synthesizing well-dispersed, uniform, magnetic, iron oxide NPs was adopted. These iron oxide NPs were used for ink-formulation and then used to demonstrate the fully inkjet-printed tunable inductor. These iron oxide nanoparticles were also used with the aim of making freestanding magnetic substrates. SU8 polymer was selected to develop thick substrates, a polymeric resin materials that can immediately solidify on exposure to a low-cost UV lamp. This SU8 solution was cross-linked through polymerization by UV exposure to make thick solid films. Through functionalization of iron oxide nanoparticles with oleic acid (to make it compatible with a UV-curable SU8 solution), the functionalized iron oxide nanoparticles were successfully embedded in the SU8 matrix, creating a freestanding, magnetic substrate. The magnetic ink was characterized for its magnetic and high frequency properties. Finally, a patch antenna was printed on the magnetic substrate with an in-house silver ink; the printed antenna was tuned for its frequency by applying magnetic fields across it. This first demonstration of a fully printed controllable RF device was an important milestone for the next generation of low-cost tunable and reconfigurable components that can be completely realized through additive manufacturing.

Experimental Section

Chemicals: Iron (II) chloride tetrahydrate ($FeCl_2 \cdot 4H_2O$, reagent plus, 98%), iron (III) chloride hexahydrate ($FeCl_3 \cdot 6H_2O$, ACS, 97-102%), sodium hydroxide (NaOH, Sigma Aldrich), acetic acid ($CH_3COOH$, ACS reagent, ≥99.7%), oleic acid [$CH_3(CH_2)_7CH=CH(CH_2)_7COOH$, technical grade, 90%], SU8 2002 (MicroChem), and ethanol (absolute, VWR Chemicals) were used as they were received, without further purification.

Synthesis of Iron Oxide NPs: As in a typical synthesis process, 0.01 M iron (II) chloride (≈0.596 g) and 0.02 M iron (III) chloride (≈1.621 g) were dissolved in about 300 mL of DI water, followed by mixing of about 1 mL of acetic acid. The resulting solution was then slowly heated in a three-necked refluxing pot while stirring (1000 rpm). When the temperature reached about 90° C., about 2 g of NaOH was added. This resulted in a black solution, indicating the formation of $Fe_3O_4$ NPs. In this reaction condition, sodium hydroxide acted as a basic source and acetic acid to break the precipitates for the formation of uniform and disperse $Fe_3O_4$ NPs. After about 10-15 min of refluxing, the black colloidal solution was obtained followed by centrifugation at about 3000 rpm for about 2 min, and washing with deionized water and ethanol.

Figure 8:
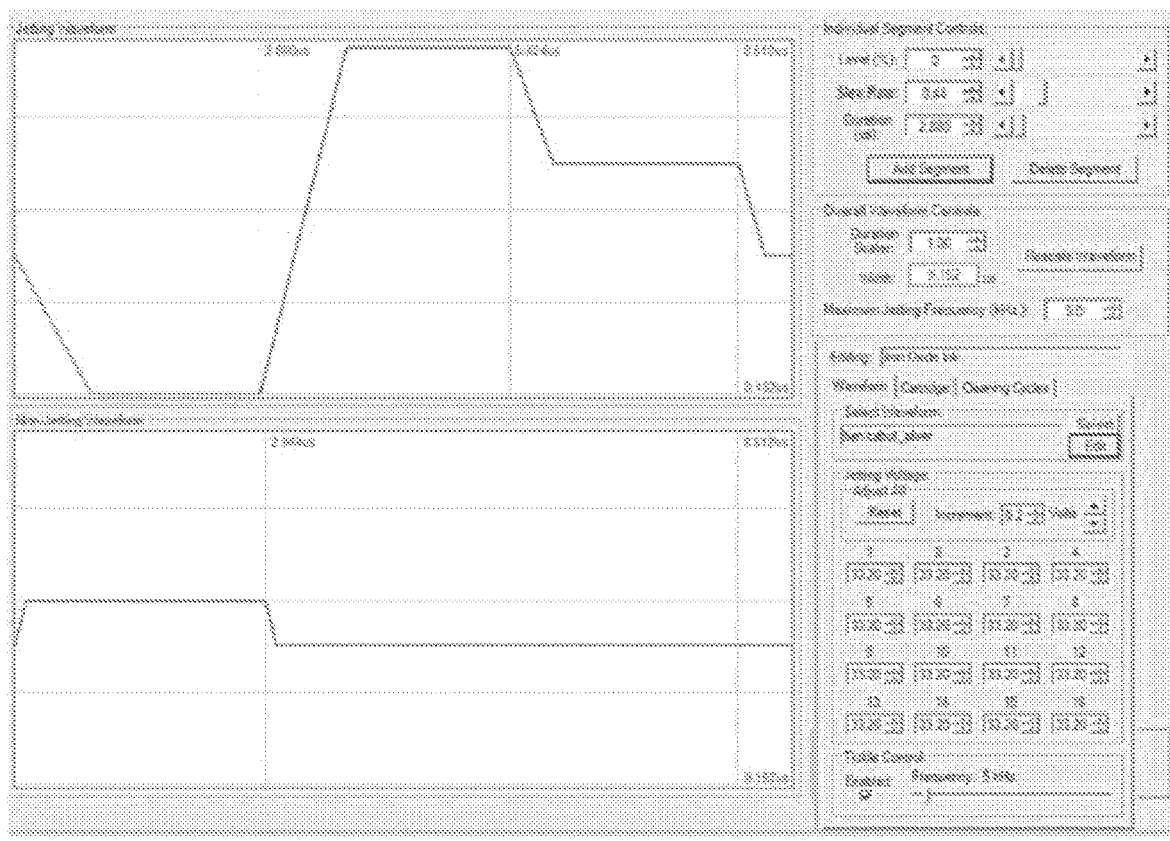
FIG. 8 is a jetting waveform for as-formulated iron oxide nanoparticles ink, according to one or more embodiments of the present disclosure.

Ink Formulation and Inkjet Printing Using Iron Oxide NPs: The as-prepared iron oxide NPs were formulated as ink in about 3 mL of deionized water. Initially, the ink exhibited a high surface tension (SFT) of ≈63 mN m$^{-1}$ which was adjusted with the addition of about 10 vol % of ethanol. After the addition of ethanol, ink exhibited an SFT of ≈44 mN m$^{-1}$, which was good for stable jetting performance, as shown in FIGS. 7A-7B. The resulting solution was then stirred for about 24 h. Subsequently, the formulated iron oxide ink was filtered by 0.45 μm polypropylene (PP) Whatman paper before jetting. The observed viscosity of as-formulated ink for ink jet printing was ≈1.74 cP, using a spindle speed of about 100 rpm and shear rate of about 132 s$^{-1}$ at about room temperature. However, the SU8 embedded iron oxide nanoparticles were showing the viscosity of about 37.8 cP, using a spindle speed of about 100 rpm and shear rate of about 132 s$^{-1}$ at about room temperature. The iron oxide dot and line patterns were directly printed on glass substrate using a drop-on-demand piezoelectric ink-jet nozzle (manufactured by Dimatix) with a diameter of 16 μm; the drop volume was about 10 pL. The uniform and continuous ejection of droplets was achieved by adjusting various wave forms while applying a firing voltage of 33.2 V at a 5 kHz printer velocity, as shown in FIG. 8. The jetting velocity of ejected droplets was ≈3.3 m s$^{-1}$ and the cartridge print height was ≈0.3 mm. The thickness of as-printed lines was varied by the number of overprinting layers using about 40 μm drop spacing.

Functionalization of Iron Oxide NPs and Their Ink Formulation: For functionalization, the wet form of iron oxide NPs was dispersed in about 50 mL of ethanol, followed by the addition of about 0.2 mL of oleic acid. The resulting solution was then stirred for about 24 h to ensure the physical absorption of oleic acid molecules on surfaces of iron oxide NPs. After stirring, the resulting solution was centrifuged at about 4000 rpm for about 2 min and washed with ethanol about 2-3 times cycle$^{-1}$ to remove access oleic acid molecules. The resulting functionalized iron oxide NPs were then ready to mix with the SU8 2002 solution.

Fabrication of a Printed Antenna on Magnetic Substrate: An in-house SOC ink was utilized in this work to print an antenna on magnetic substrate. The SOC ink produced smooth and dense films; it was stable and transparent. The antenna was printed on magnetic substrate (t≈1500 μm) using eight layers of AOC ink at about 30 μm drop spacing with a 10 pL Dimatix DMP 2831 inkjet printer. A low-cost 250 W IR lamp was used to cure the ink by placing the substrate under the lamp for about 5 min after each printed layer. The maximum measured temperature of the substrate was about 80° C.

Characterization: The structural properties were examined using scanning electron microscopy (Zeiss Merlin with Gemini 2 column) and transmission electron microscopy (FEI Titan G2 80-300 kV equipped with a 2 k×2 k CCD camera model US4000, Gatan, Inc.). The elemental quantification was examined with EDS equipped with FEI Nova Nano. In addition, the thicknesses and uniformity of printed features on substrates were measured using a surface profiler (Veeco Dektak 150). The crystallinity of the iron oxide powders was examined by X-ray diffraction (Bruker D8 Advance) in the range of 20°-70° at 40 kV. Furthermore, the UV-vis absorption spectrum of the ink was obtained using a UV-vis spectrophotometer (Cary 100 UV-vis-NIR) with a standard 1 cm liquid cuvette and a background calibration that was run using ethanol. The chemical functionalization was characterized by FTIR spectrometers (Nicolet 6700). The FTIR sample was prepared using KBr pellet method.

≈0.1-1.0% sample was well mixed into ≈200 mg fine KBr powder and then finely pulverized using stone mortar and pestle. After pulverization, the resultant powder was placed in to a pellet-forming die for making transparent pellets. In order to correct the infrared light scattering loses in the pellet, a background measurement was done on a pellet holder with a pellet of KBr only. Finally, the sample was loaded and its measured infrared spectrum was recorded. Furthermore, viscosities of the inks were measured using a Brookfield Rheometer (DV3T). The surface tensions of the inks were measured by using a KRUSS DSA100 based on pendant drop method. The particle size analysis of the ink was done using Zetasizer (Malvern Instrument). Before analysis, ink was diluted ten times with DI water. The magnetic properties of iron oxide nanoparticles were examined by SQUID-VSM.

Synthesis and Functionalization of Iron Oxide NPs

Iron oxide NPs were prepared at about 90° C. with iron (II) chloride, iron (III) chloride, NaOH, and acetic acid using the hot-injection solution method for about 30 min, without the use of any complex reagents. The presence of acetic acid and addition of sodium hydroxide at heating temperature played an important role in the formation of small iron oxide NPs. If sodium hydroxide was added to the boiling solution with the presence of acetic acid, higher temperatures generally caused faster reaction rates, generating large amounts of nuclei in a short time and leading to the formation of small nanoparticles. Iron oxide NPs usually possess typical magnetic behavior at about room temperature (RT). To the best of present knowledge, there is no report of any iron oxide NP-based ink formulation for inkjet printing. Several significant issues related to magnetic ink formulation must be addressed. For example, magnetic materials should be nanoparticle sized and be well dispersed during formulation, ink viscosity and surface tension must be suited for inkjet printing, and ink must contain the appropriate concentration and a carrier vehicle (solvent). In the field of printed electronics, similar to other emerging electronic technologies, new materials and processing methods are required for their continually improving development and performance.

Figure 10A:
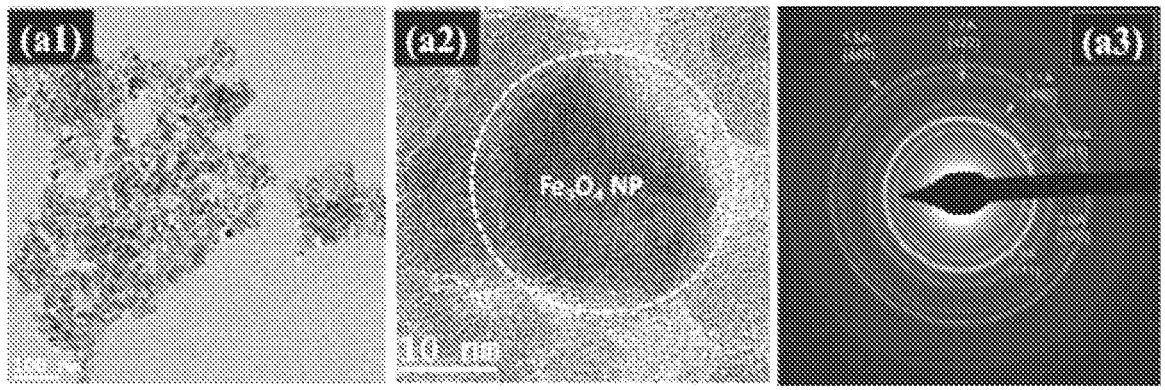
FIGS. 10A-10C are TEM, HR-TEM images, and SAED patterns of (a) pure iron oxide, (b) oleic acid functionalized, and (c) SU8-mixed iron oxide nanoparticles, according to one or more embodiments of the present disclosure.
Figure 10B:
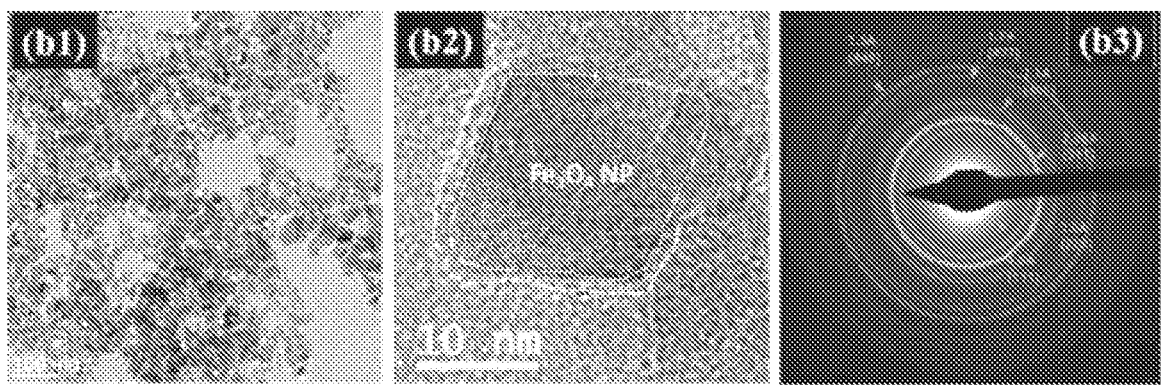
Figure 10C:
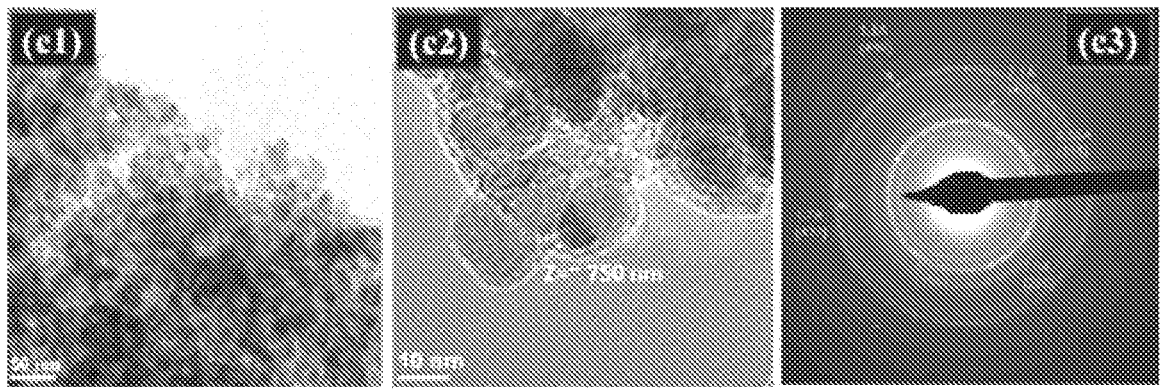

The as-prepared iron oxide NPs showed good dispersion with deionized (DI) water and were successfully utilized as a solvent for inkjet printing. To be compatible with SU8 polymeric resin, iron oxide required functionalization on the surfaces of nanoparticles. SU8 2002 manufactured by Micro-Chem is usually composed of an epoxy that is dissolved into an organic solvent (e.g., cyclopentanone). Oleic acid was successfully used as a molecule for functionalization of iron oxide nanoparticles. The selection of oleic acid was due to its compatibility with cyclopentanone of SU8 polymeric resin in addition to many common organic solvents. Furthermore, the choice of SU8 was also due to its low wt % of resin with low viscosity solvent composition and its photocuring capability. A number of other photocurable polymeric resins were available but due to their high content of resin (>99%) and high viscosity, it may be very challenging to embed the nanoparticles in those resins. Thus, for compatibility with SU8 2002, iron oxide nanoparticles were functionalized with oleic acid, as shown in FIG. 9A. The physical adsorption of oleic acid molecules on the surfaces of iron oxide NPs led to compatibility with the SU8 matrix, as the long chain of oleic acid interacted with the organic solvent. Subsequently, these SU8-mixed nanoparticles were pre-heated at about 80° C. for about 15 min, followed by UV curing with a wavelength of about 365 nm for about 30 min to solidify the mixture. FIGS. 9B-9G show the scanning electron microscopic (SEM) images and energy-dispersive spectroscopic (EDS) spectrum taken from the as-prepared, functionalized, SU8-mixed iron oxide NPs. The SEM image (FIGS. 9B, 9C) shows that the NPs are almost spherical shape; they were uniformly grown at a high density with an average diameter of about 15-20 nm. It should be noted that due to charging effect and magnetization of iron oxide nanoparticles, high-resolution images were difficult to capture. The EDS spectrum (FIG. 9E) demonstrates that the as-prepared NPs are made of Fe and O only, and the atomic ratio of Fe and O is ≈3:4. In contrast to pure iron oxide NPs, the oleic acid functionalized sample (FIG. 9F) shows the carbon content in addition to Fe and O, which confirmed the functionalization on the surfaces of iron oxide NPs. The SU8 mixed iron oxide NPs (FIG. 9G) show even higher carbon content, primarily due to SU8 molecules. The SU8-mixed, iron oxide morphology (FIG. 9D) confirmed that nanoparticles were well-embedded in the SU8 matrix. The particle's size and shape were further confirmed by its corresponding transmission electron microscopic (TEM) images. FIGS. 10A-10C show TEM image, high-resolution TEM (HRTEM) image, and selected area diffraction (SAED) pattern of (FIG. 10A) pure, (FIG. 10B) functionalized, and (FIG. 10C) SU8-mixed iron oxide NPs. From the TEM images, it was confirmed that nanoparticles were in various shapes such as spherical, cubic, and elongated. Such shapes are common in iron oxide nanoparticles during the nucleation and growth formation. The functionalization of iron oxide was also visualized by an HRTEM image (FIG. 10B2), showing ≈2-3 nm of carbon shell on the core of the nanoparticles. Furthermore, the HRTEM image (FIG. 10C2) of the SU8-mixed sample showed a thick boundary of the SU8 carbon-coated matrix, in which iron oxide nanoparticles were suspended. The SAED patterns (FIGS. 10A3-10C3) for all the samples, confirmed the polycrystallinity phase of as-grown iron oxide NPs, corresponded to the cubic spinel structure. Due to thick boundary of SU8 matrix, the intensity of SAED pattern was faded which further confirmed that iron oxide nanoparticles were embedded in the SU8 matrix. It should be noted that TEM analyses were only for morphological characterization purpose. However, functionalization and embedding could be efficiently confirmed by Fourier transform infrared (FTIR) analysis.

Chemical Nature and Crystalline Phase of Iron Oxide NPs

Figure 11A:
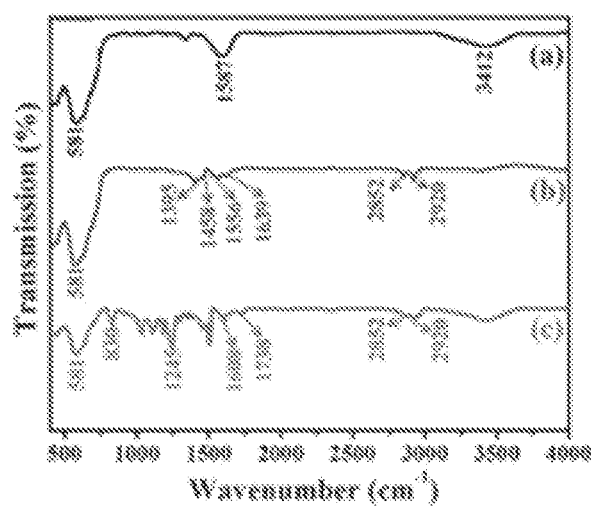
FIGS. 11A-11B show (A) FT-IR spectra and (B) XRD patterns of a) pure iron oxide, b) oleic acid functionalized iron oxide nanoparticles, and c) SU8-mixed iron oxide nanoparticles, according to one or more embodiments of the present disclosure.
Figure 11B:
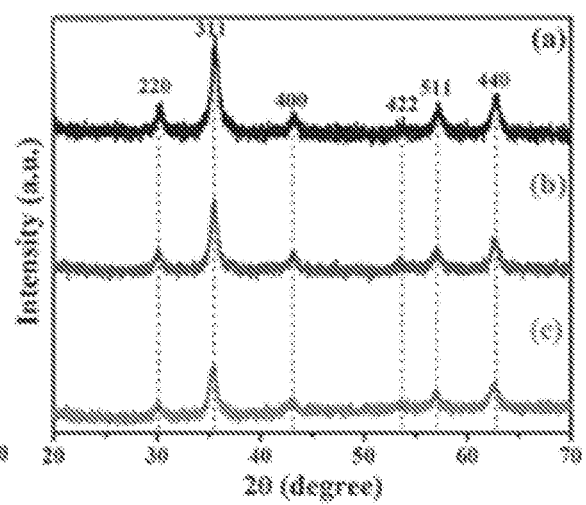
Figure 12:
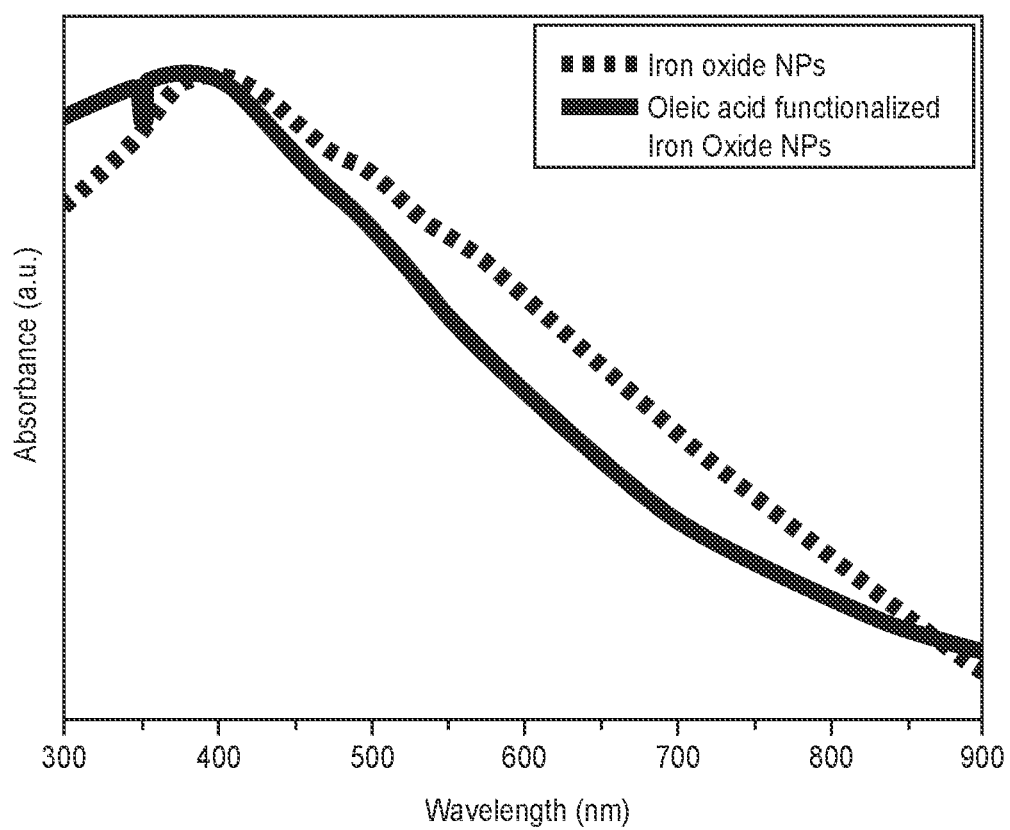
FIG. 12 is a graphical view of UV-Vis absorption spectra of pure and oleic acid functionalized iron oxide NPs, according to one or more embodiments of the present disclosure.

The quality and chemical composition of (a) as-synthesized, (b) oleic acid functionalized, and (c) SU8-mixed ironoxide NPs were further examined by FTIR spectroscopy in transmission mode and are shown in FIG. 11A. In the as-synthesized sample, weak adsorption bands appeared at 3412 and 1587 $cm^{-1}$ as well as a strong adsorption band at 581 $cm^{-1}$. The weak adsorption bands were attributed to the stretching vibration and bending vibration of the absorbed water and surface hydroxyls, respectively. Moreover, the presence of the strong band was due to Fe—O stretching vibration. Surface absorbed moisture was common during sample preparation for FTIR analysis. Therefore, the FTIR spectrum confirmed that the synthesized product was pure iron oxide NP (a). The bands at 1395 and 1458 $cm^{-1}$ were ascribed to the symmetric and asymmetric stretches of COO—, indicating that the oleic acid molecule was attached to the iron oxide nanoparticles in a bidentate mode, with two oxygen atoms symmetrically coordinated to iron (b). The characteristic vibrational bands at 2852 and 2920 $cm^{-1}$ were attributed to the symmetric and antisymmetric —CH2 stretching from the structure of oleic acid. In addition, the band at 1639 $cm^{-1}$ was due to C=C from oleic acid. The SU8-mixed iron oxide sample showed several characteristic bands at 830, 1245, 1608, and 1738 cm$^{-1}$, which, respectively, corresponded to an epoxide, aromatic ring, and carbonyl group from the SU8 molecules. FIG. 11B shows the X-ray diffraction (XRD) patterns that were implemented to examine the crystal structure of iron oxide nanoparticles (a) before and (b) after functionalization, and (c) SU8-mixed samples. All characteristic peaks are matched with the cubic spinal-structured magnetite (JCPDS card no. 65-3107). The optical properties of the as-synthesized and functionalized samples were also investigated by UV-vis absorption (FIG. 12). The UV-vis absorption spectrum showed that, as the wavelength decreased, absorbance increased monotonically. The UV-vis spectrum indicated that the wide absorption range from 300 to 900 nm occurred with a broad peak center at 400 nm, corresponded to iron oxide absorption. The wide absorption may be caused by cluster formation of iron oxide NPs in an ethanol solution, which scattered almost UV radiation and provided long-tail-type features in the UV-vis absorption spectrum.

Magnetic Properties of Iron Oxide NPs

Figure 13A:
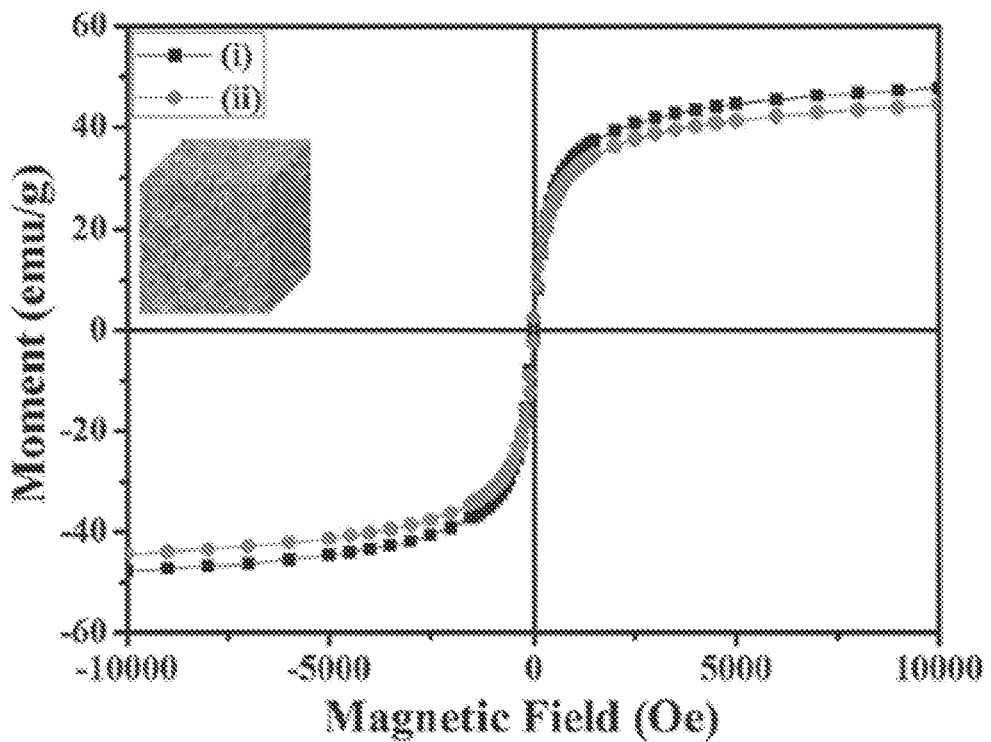
FIGS. 13A-13B are graphical views of a) Hysteresis loop of (i) pure iron oxide and b) oleic acid functionalized iron oxide nanoparticles at (a) 300 K and (b) 5 K, along with the full range of the hysteresis measured between −10 000 and 10 000 Oe (inset); the insets in (a) and (b) show the pictorial presentation of loosely bound nanoparticles in a freezing state, according to one or more embodiments of the present disclosure.
Figure 13B:
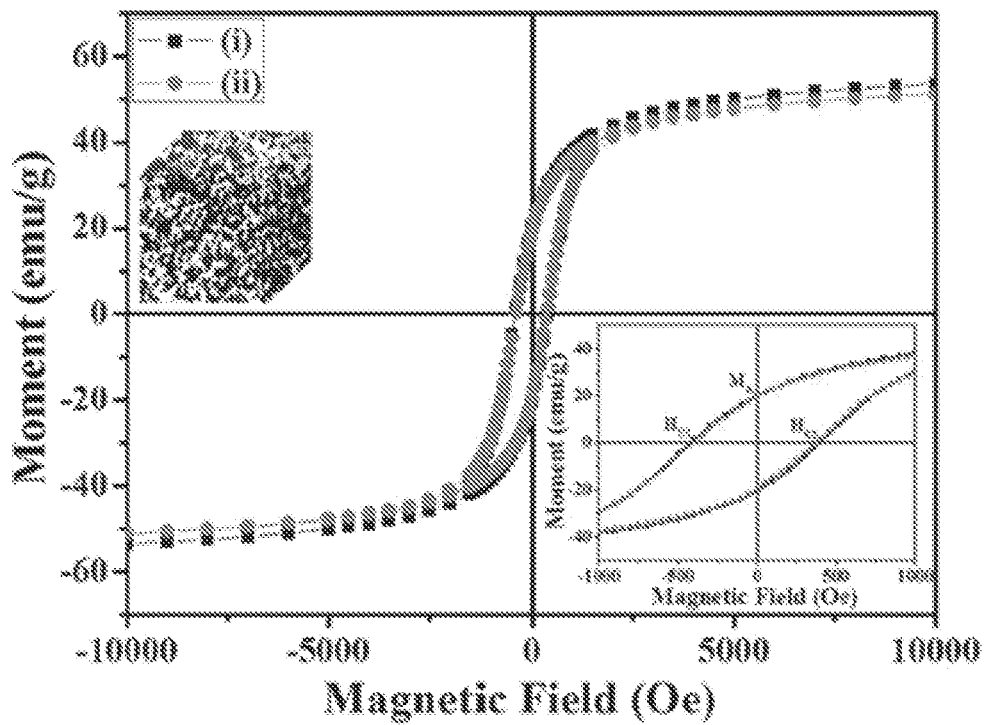

FIGS. 13A-13B demonstrate the magnetization versus magnetic field plots (M-H loops) measured at 300 K, in addition to the full range of hysteresis between ±10 kOe for the as-synthesized and oleic acid functionalized iron oxide NPs. The samples showed no hysteresis at RT, signifying the superparamagnetic nature of the resultant NPs (a). A well-developed hysteresis loop was observed at 5 K, signifying the ferromagnetic nature of the resultant NPs (b). While not wishing to be bound to a theory, it was believed that, due to the air-gap condition and loosely bound nanoparticles at RT measurement, the samples were superparamagnetic nature. In contrast to RT measurement, the freezing state (at 5 K) condition satisfied the gap and loosely bound state, demonstrating the ferromagnetic nature, as shown with the pictorial presentation in FIGS. 13A-13B. Furthermore, the saturation magnetization (Ms), remanent magnetization (MR), and coercivity (Hc) were calculated as 51-53 emu g$^{-1}$, 20.31 emu g$^{-1}$, and 400 Oe for as-synthesized and oleic acid functionalized iron oxide NPs, respectively (FIG. 3B). Compared to the bulk iron oxide, the decrease in $M_s$ was attributed to the decreased particle size and an increase in surface area.

Figure 14:
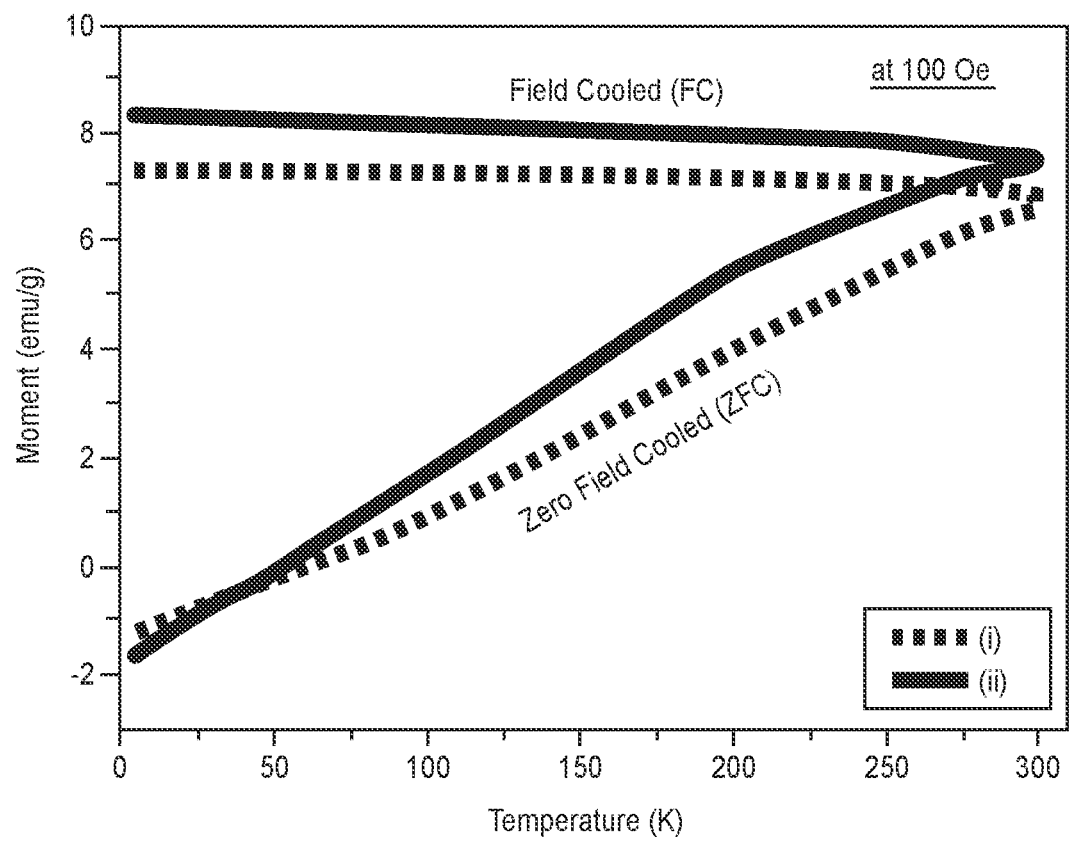
FIG. 14 is a graphical view of temperature dependence magnetization of (i) pure and (ii) oleic acid functionalized iron oxide NPs in field cooled (FC) and zero field cooled (ZFC) at an applied field of 100 Oe, according to one or more embodiments of the present disclosure.

The energy of a magnetic particle in an external field is proportional to its size or volume via the number of magnetic molecules in a single magnetic domain. When this energy becomes comparable to the thermal energy, thermal fluctuations will significantly reduce the total magnetic moment at a given field. Such a phenomenon is more prominent with small nanocrystals. The temperature-dependent magnetization was also characterized (FIG. 14), which was typical to magnetic nanoparticles. Zero-field cooled (ZFC) and field-cooled (FC) curves were measured in a magnetic field of 100 Oe in the temperature range of 5-300 K. The graph shows the two FC and ZFC curves, which have a divergence point close to room temperature. Moreover, FC magnetization remains nearly constant as the temperature decreased, whereas ZFC magnetization decreased as the temperature decreased. There was no distinctive blocking temperature (TB), which must be investigated further by varying the magnetic field.

Figure 15:
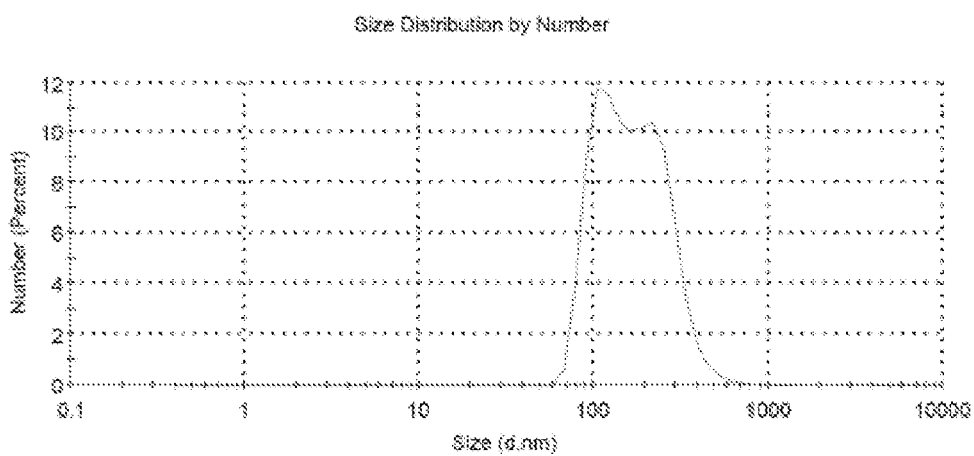
FIG. 15 is a graphical view of particle size distribution, where before analysis, the as-formulated iron oxide nanoparticles ink were diluted 10-times with deionized (DI) water, according to one or more embodiments of the present disclosure.
Figure 17D:
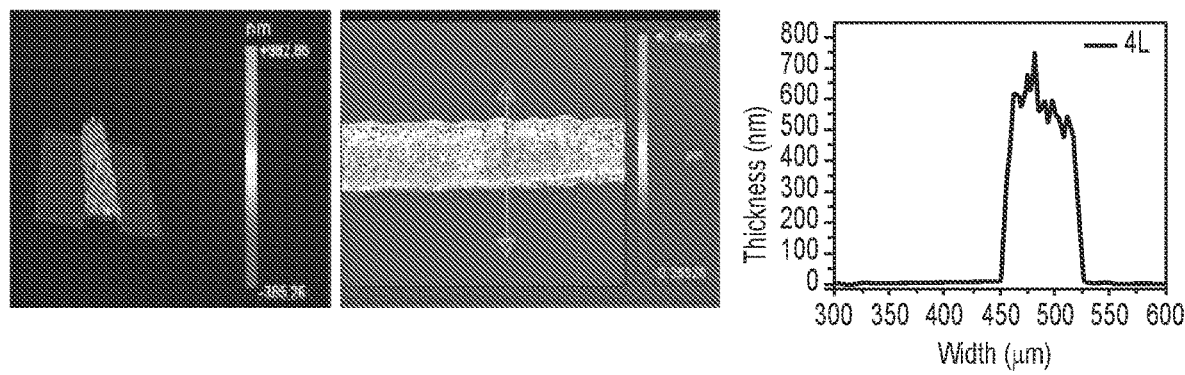
FIGS. 17D-17E are 3D, 2D and cross-sectional surface profiler images of inkjet-printed iron oxide: (d) 4 over-layer, and (e) 5 over-layer, according to one or more embodiments of the present disclosure.
Figure 17E:
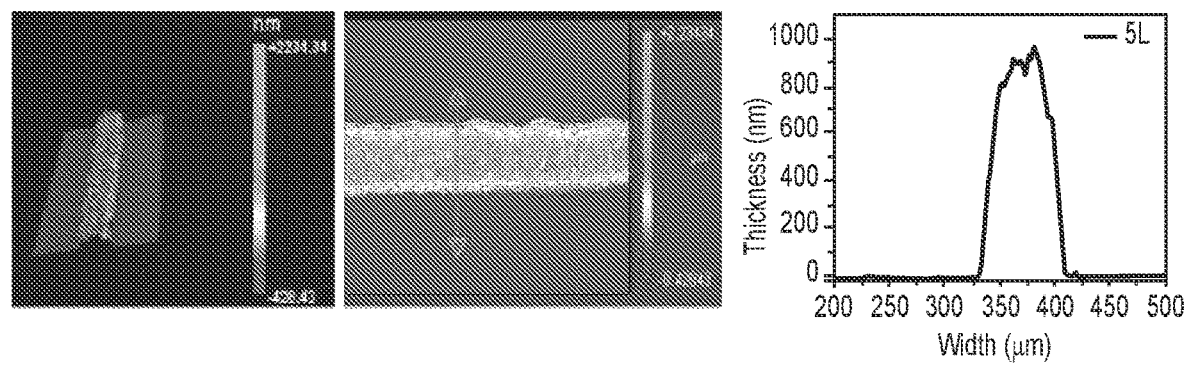
Figure 18:
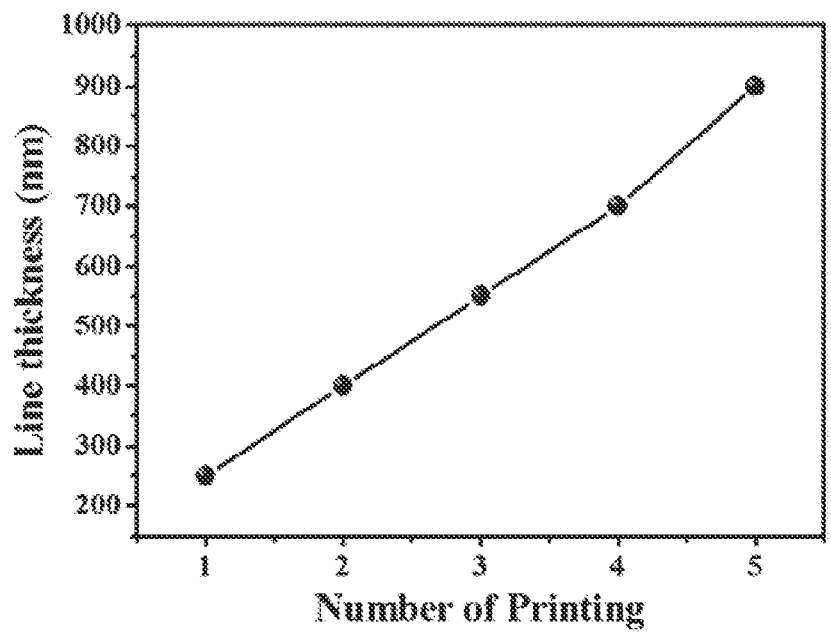
FIG. 18 is a graphical view of thicknesses of inkjet-printed lines with number of printing, according to one or more embodiments of the present disclosure.

Inkjet Printing of Magnetic Ink and Fabrication of Fully Printed Tunable Inductor As-synthesized iron oxide NPs were used for ink formulation with about 10 wt % loading in water solvent. To confirm the particle size aggregate in the ink, the ink was diluted ten times with deionized (DI) water and characterized using Zetasizer (as shown in FIG. 15). The graph clearly shows the size distribution with number of particles. The ≈51.7% particle aggregates corresponded to 121.5 nm, 48% for 242 nm, and 0.2% for 2582 nm. The ink was inkjet printed under constant printing conditions and vertically dropped from the nozzle, which formed dots (FIGS. 16A-16B) and lines (FIGS. 17A-17E) on the glass substrate. The 3D image of the dots showed the uniform dot pattern with a high density of NPs covering the entire dot area (FIG. 16A). The 3D surface profiler measured the dot width as ≈55 μm and the thickness was ≈160 nm (FIG. 16B). To further study the effect of overprinting on the substrate-surface-ink interaction and line uniformity, the line patterns with a drop spacing of 40 μm were printed on glass substrates while varying the number of overlayers ($n_{ol}$). The as-printed iron oxide lines were analyzed by the 3D surface profiler with varying $n_{ol}$ (FIGS. 17A-17E). The printed lines showed a width of 70±10 μm with number of overlayers. FIG. 17A corresponds to the single printing, which revealed that the density of NPs was not uniform along the width (i.e., there was a higher density at the edge of line than in the middle area; a-2). The first layer of printing was directly related to the substrate-ink interaction and its compatible properties, such as the surface tension of ink and surface energy of the substrate, directed the quality of printed lines. With successive overprinting, the edge area may be covered with more NPs and eventually printed with a more uniform pattern line. To confirm this, an overprinted layer was printed over the first-printed layer. As shown in FIGS. 17B-17C, line uniformity and density was substantially improved by increasing the number of overlayers from 1 to 5. In addition, all the printed lines with the ink did not show any coffee-ring effects or line bulging. The thickness of the as-printed lines with $n_{ol}$ was summarized in FIG. 18. The thicknesses of printed lines was controlled by the number of overprinted layers and by varying the drop spacing.

Figures 19A, 19B, 19C:
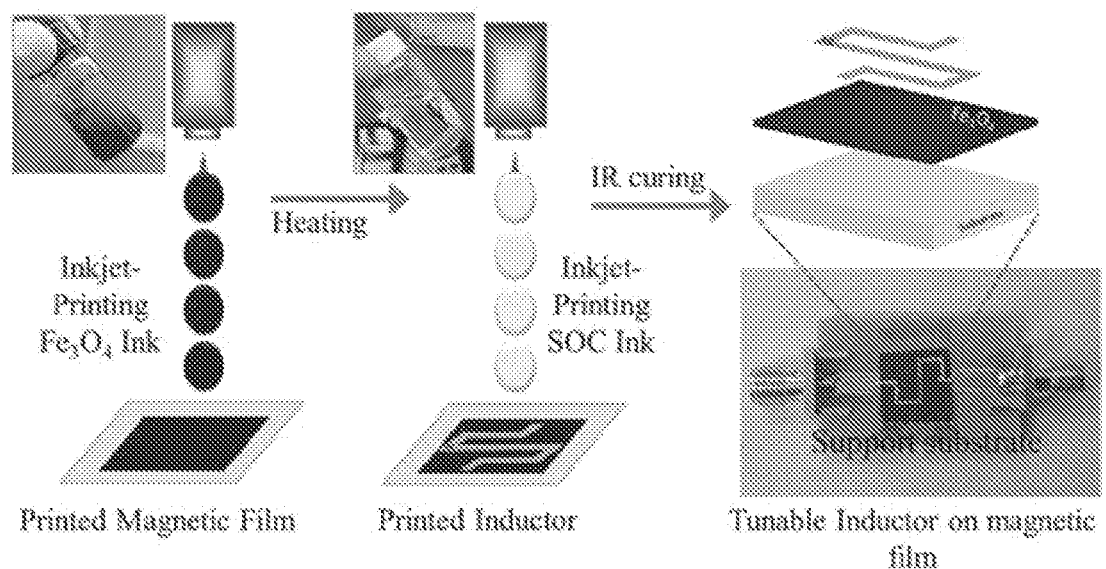
FIGS. 19A-19C illustrate a schematic diagram of the fabrication of a fully printed tunable inductor, according to one or more embodiments of the present disclosure.
Figure 20A:
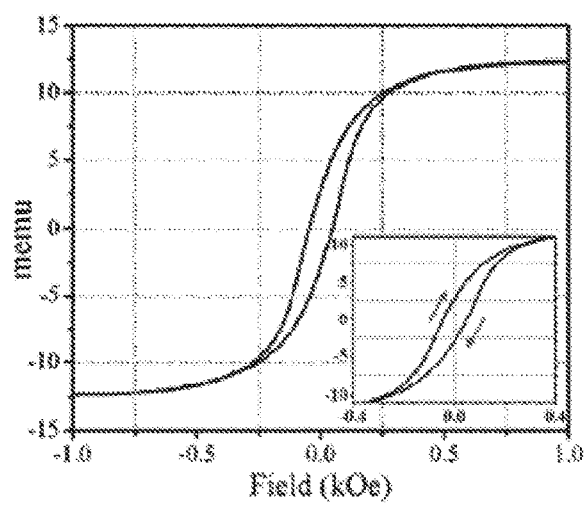
FIGS. 20A-20B are graphical views of VSM measured hysteresis curves of (a) printed magnetic film using the iron oxide nanoparticles based ink and (b) using commercially available ink (the inset in (a) and (b) showing zoomed hysteresis curve), where commercial ink showed the saturation magnetization of approximately 0.18 memu under applied field of 3 kOe and the coercivity is found to be 51 Oe, as shown in (b), according to one or more embodiments of the present disclosure.
Figure 20B:
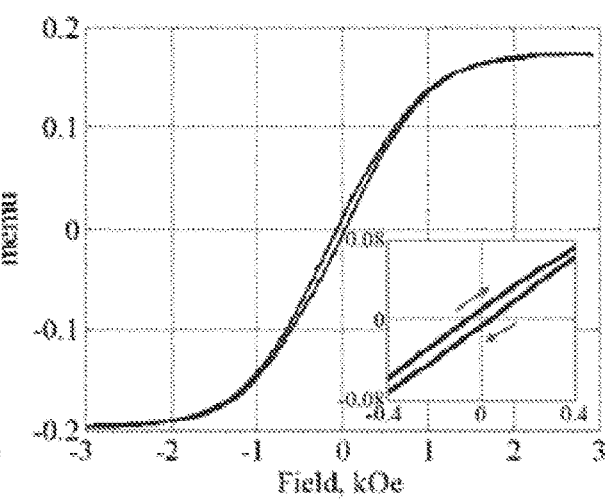
Figures 21A, 21B:
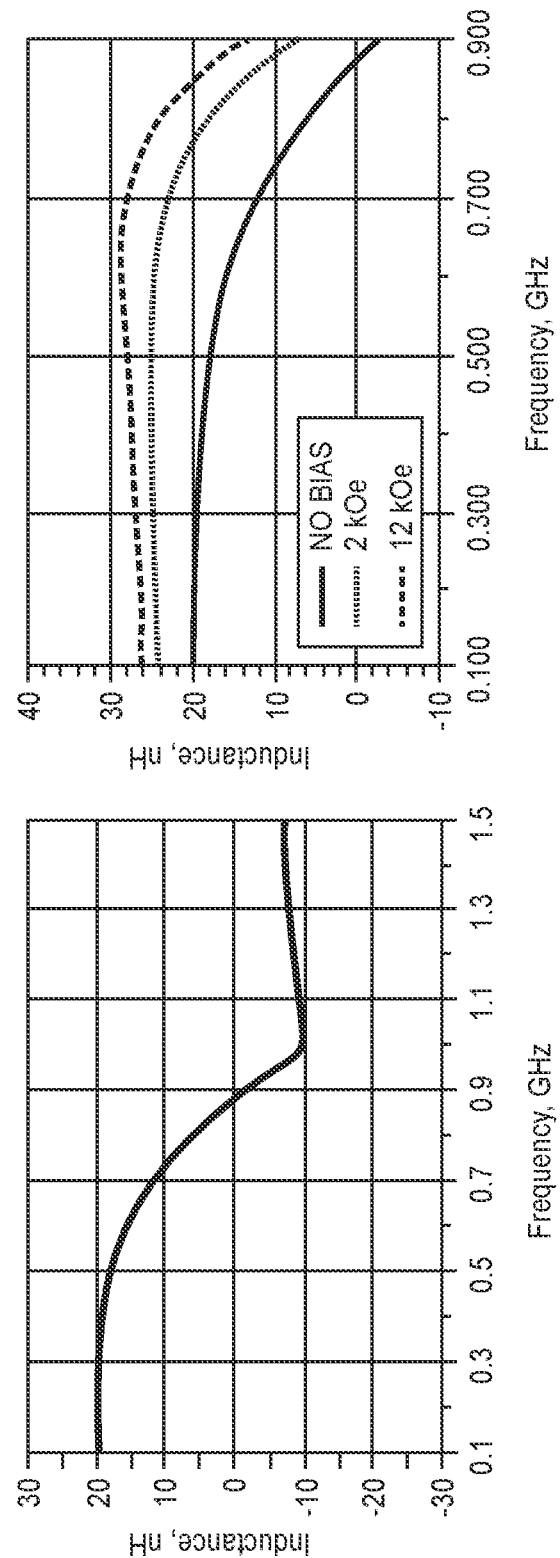
FIGS. 21A-21B are graphical views of a) measured inductance showing the self-resonance frequency (SRF) and b) zoom-in view to show the change in inductance with magnetic field bias, according to one or more embodiments of the present disclosure.
Figure 22B:
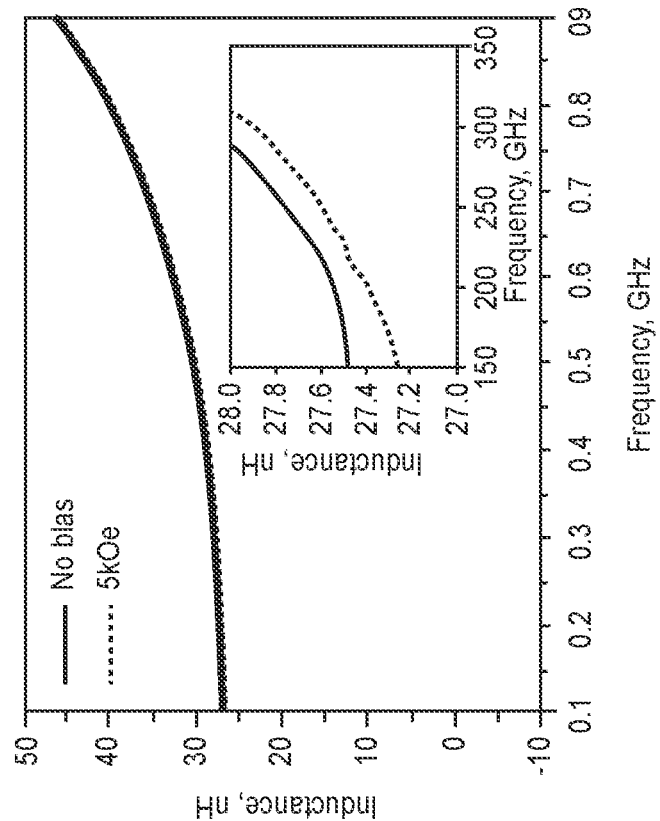
FIGS. 22A-22B are graphical views of (a) measured inductance for fully printed tunable inductor using commercial iron oxide ink and (b) change in inductance with magnetic field bias (with the inset in (b) showing a zoomed-in view), where commercial ink was printed with 10 layers with each layer having a thickness of around 100 nm and the magnetic layer then being heated for 5 minutes at 160° C. to evaporate the solvent, wherein the measured SRF of the inductor is ~1.4 GHz as shown in (a), according to one or more embodiments of the present disclosure.
Figure 22A:
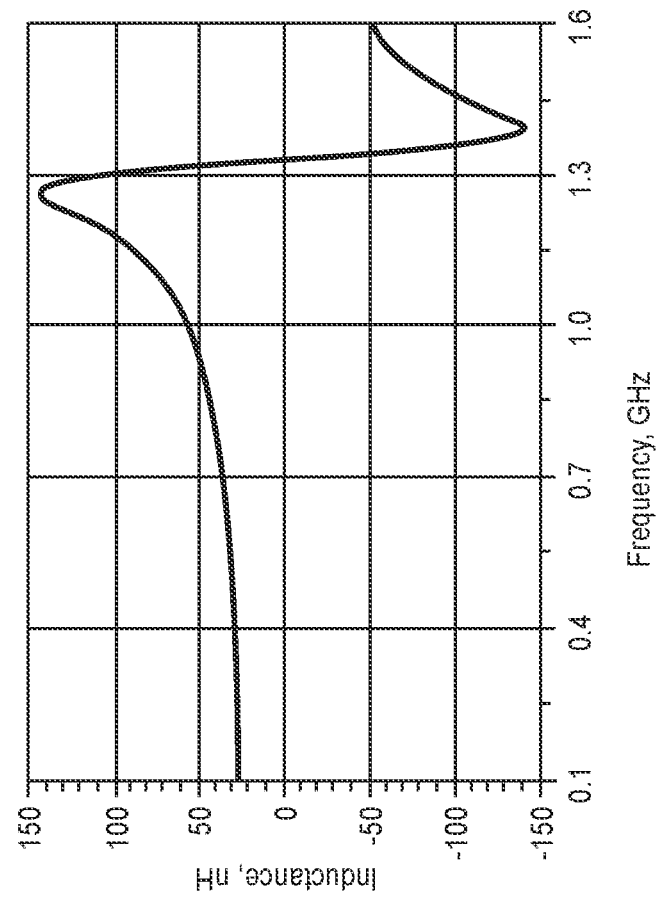

In order to evaluate the functional properties of the magnetic ink, a tunable inductor was fabricated on top of an inkjet-printed magnetic film, as shown in FIGS. 19A-19C. First, iron oxide nanoparticles ink were inkjet printed on a plastic substrate with five overprinted layers, followed by drying at about 80° C. for about 30 min (FIG. 19A). The printed film resulted in a saturation magnetization of ≈12.4 memu under an applied field of about 1 kOe, while the coercivity was found to be 46 Oe, as shown in FIGS. 20A-20B. After printing the magnetic film, a total of eight layers of silver-organo-complex (SOC) based silver ink was printed and cured using infrared (IR) heating for about 5 min (FIG. 19B). Finally, the fully printed tunable inductor was attached on an FR4 board (support substrate) for testing purpose, as shown in (FIG. 19C). For RF characterization of the inductor, two port S-parameter measurements were performed using Agilent E8361C PNA series network analyzer. The inductor was fed by a 50Ω microstrip transmission line. The measured inductance of the printed inductor is shown in FIGS. 21A-21B. At 100 MHz, it had an inductance of about 19.6 nH and self-resonant frequency (SRF) of about 870 MHz (a). To measure the tunability of the printed inductor, an external magnetic field of up to 12 kOe was applied using MicroMag 3900 vibrating sample magnetometer (VSM). The inductance versus the frequency under the influence of external magnetic field for printed inductor is shown in FIGS. 21A-21B. A tuning of about 24% was observed when about 12 kOe magnetic field was applied. A smaller tuning of about 18% was observed when lower magnetic field of about 2 kOe was applied. The fully printed inductor realized with the formulated ink described herein showed much higher tuning than the case when commercial iron oxide nanoparticles ink were used (only 0.8% tuning with 5 kOe magnetic field, FIGS. 22A-22B). The results summarized in Table 1 clearly indicated superior performance and suitability to tunable RF components as compared to the commercially available ink.

Fabrication of Freestanding Magnetic Substrate and its Characterization

Figures 23A, 23B, 23C:
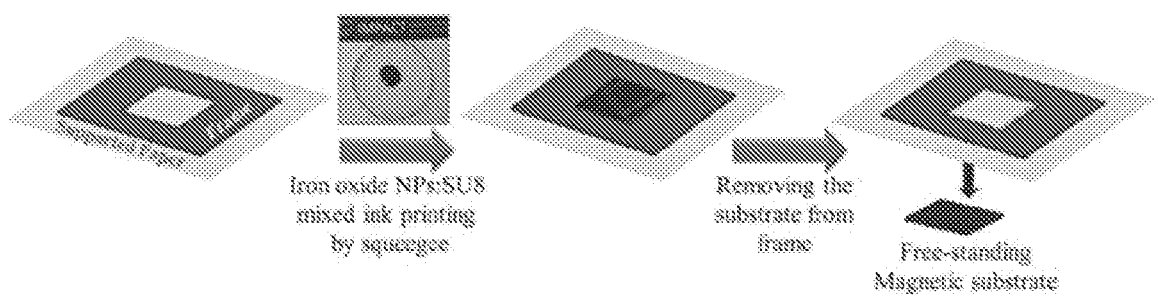
FIGS. 23A-23F illustrate a schematic diagram of the fabrication of freestanding magnetic substrate followed by inkjet printing of a patch antenna, according to one or more embodiments of the present disclosure.
Figures 23D, 23E, 23F:
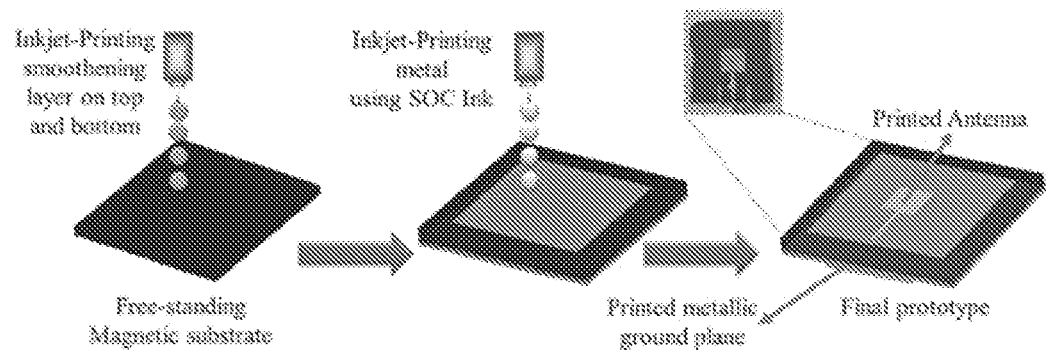

Functionalized iron oxide nanoparticles were successfully embedded in the SU8 matrix to develop freestanding magnetic substrate. The functionalized iron oxide nanoparticles were mixed using stone mortar and pestle with the SU8 2000 (Microchem) epoxy resist at a 50:50 wt % ratio to formulate ink paste. When the ink paste was ready, it was printed using a manual screen-printing technique (i.e., squeegee). The steps for the fabrication process are displayed in FIGS. 23A-23F. An FR-4 board with a sacrificial paper on the backside was used as a support material in this work, though any other material can be used instead of FR-4. The sacrificial paper was used because the ink was initially in a paste form and a support substrate was required until it solidified after UV exposure. A slot was created in the support material using LPKF4 Protomat S103 (a) to facilitate the printing of magnetic ink for a precise substrate thickness of about 1.5 mm. The empty slot was filled with the ink paste in three cycles. For each cycle, the filled materials were heated to about 80° C. for about 15 min followed by UV curing ($\lambda$=365 nm) for about 15 min (b). Once the ink was solidified with three cycles of the heating and the curing process, it was separated from the support material by cutting it from the edges (c). The sacrificial paper on the back of the magnetic substrate was removed by immersing it in warm water for about 10 min. An about 10 μm smoothening layer of "3D vero black plus" material was then inkjet printed and photocured on the top (d) and bottom (e) of the magnetic substrate. A total of eight layers of SOC ink each for ground plane and patch antenna were printed and cured using IR heating for about 5 min (f). The final prototype of patch antenna is shown in the inset of FIG. 23F. The preparation of freestanding substrate was performed through manual printing. However, through integrating advanced printing technology, such as a 3D printer equipped with a UV curing system, in-demand magnetic objects may be easily be created.

Magnetostatic and Microwave Characterization

Figure 24A:
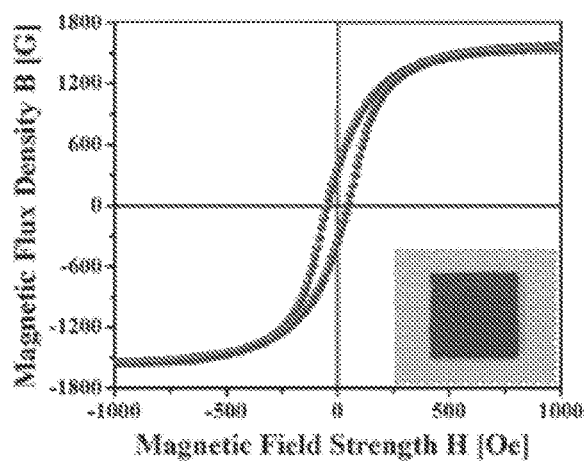
FIGS. 24A-24B are graphical views of a) Measured B(H) curve of printed freestanding substrate and b) product of permittivity, and permeability and loss tangent of the magnetic ink versus frequency, according to one or more embodiments of the present disclosure.

Once the magnetic substrate was prepared, it was important to characterize its magnetostatic and microwave properties. A VSM was used for the B(H) curve measurements of the magnetic substrate, where B was the magnetic flux density and H was the magnetic field strength. The substrate, without any metallic layers on top, was placed in the VSM; the measured B(H) curve results are displayed in FIG. 24A. The substrate demonstrated a saturation magnetization (4πMS), coercive field (HC), and remanent magnetization (BM) of about 1560 Gauss (G), about 46 Oe, and about 350 Gauss, respectively. For microwave tunable designs, stronger the saturation magnetization, larger is the tunability of the component. Here, the value of 1560 G was acceptable and provided decent tuning. This value may be increased by modifying the composition of the ink. After obtaining saturation magnetization, the next important parameter was the magnetization frequency of the substrate. The magnetization frequency was an important characteristic of ferrites because the ferrites do not show any low field losses after this frequency. From the saturation magnetization, the magnetization frequency of the material was calculated using the following formula: $f_m = \gamma 4\pi M_S = 4.37$ GHz. It was recommended that the center frequency of a microwave device be higher than the magnetization frequency of the substrate to avoid any low field losses.

Figure 24B:
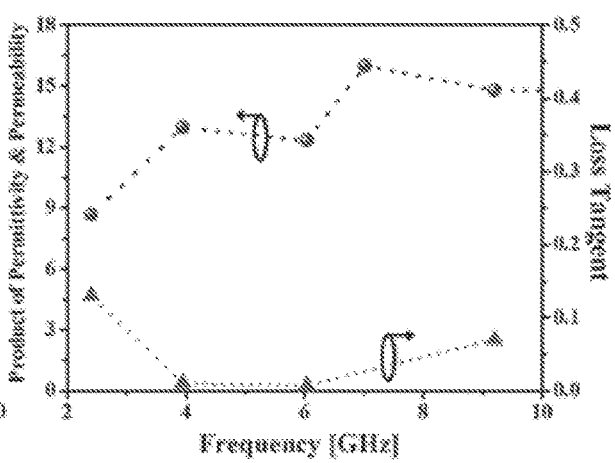

Once the magnetostatic properties of the material were known, it can be studied for its high-frequency and microwave properties. To extract the microwave properties of the printed substrate, a coplanar waveguide (CPW) based ring resonator was designed and fabricated on top of the substrate. The resonator was characterized for its S parameters from 1 to 10 GHz, and the fundamental resonance of the design was measured at 2.4 GHz. These results were used to extract the dielectric constant of the material. Since this was a magnetic material, the result obtained from the equation provided a product of the initial permeability and permittivity. This product was displayed in FIG. 24B. The value of this product varied with respect to the frequency, which was expected due to the varying initial permeability of the ferrite material. Using this equation, the permittivity and permeability of the medium at different frequencies were calculated and are listed in Table 2. Since the material was lossy below $f_m$, frequencies above $f_m$ were considered in the table since these were the frequencies that may be used for the antenna design. In the initial design of any microwave device, this product can directly be used in the equation of the resonant frequency. In addition to the dielectric constant, the loss tangent (tan δ) of the material was calculated from the measured results. The conductor losses were calculated using the transmission line calculator of the Keysight in the Advanced Design System (ADS). The measured conductivity of the metal was about $5 \times 10^6$ S m$^{-1}$, which was used to evaluate the conductor loss for different frequencies. Once the conductor loss was known, the dielectric loss of the material was evaluated. The loss tangent of the substrate at frequencies below $f_m$ was relatively high. For example, at about 2.4 and about 4 GHz, the loss tangent values were 0.13 and 0.015, respectively, due to the low field losses of the magnetic material in the absence of the magnetic bias. However, the loss tangent values at frequencies above $f_m$ are in the acceptable range.

Printed Linear Patch Antenna

Figure 25A:
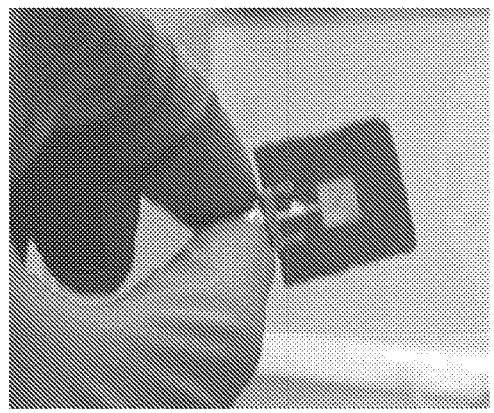
FIGS. 25A-25D show a) fabricated antenna on freestanding magnetic substrate, b) measured frequency tuning, c) measured 3D radiation pattern, and d) $S_{11}$ measurements for no bias and 3.7 kOe bias for the inkjet-printed patch antenna, according to one or more embodiments of the present disclosure.
Figure 25B:
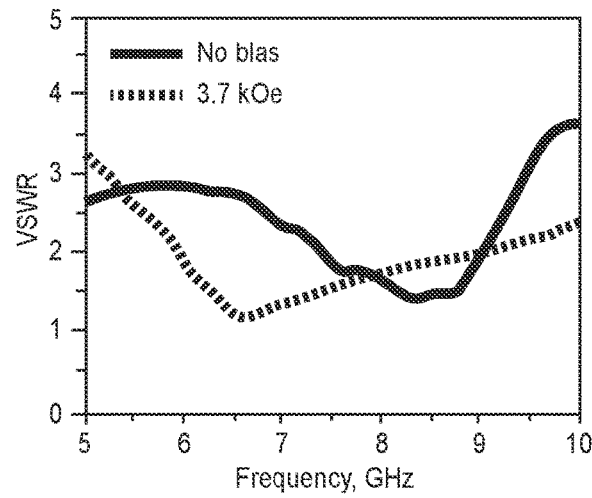
Figure 25C:
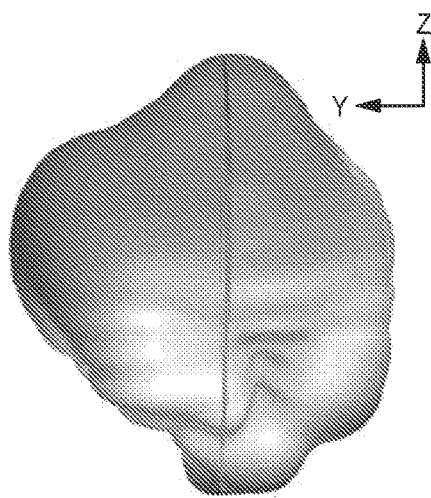
Figure 25D:
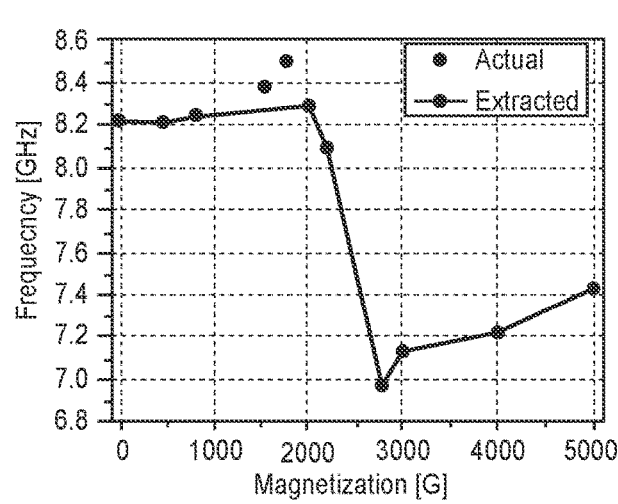

The magnetostatic and microwave characteristics of the printed magnetic ink were then used for the design of a patch antenna. The patch antenna design was used as proof of concept to show the viability of this ink in the implementation of tunable and reconfigurable passive microwave components. A rectangular patch antenna operating at about 8 GHz was designed and fabricated using inkjet printing, as shown in FIG. 25A. The frequency of operation was almost twice the value of $f_m$, thus avoiding the lossy spectrum of the substrate. The antenna had dimensions of about 6.4×7 mm. The antenna was initially measured for its impedance properties without any magnetic bias, as shown in FIG. 25B. Subsequently, the antenna was characterized for its 3D radiation pattern, as shown in FIG. 25C. The maximum gain of the antenna was ≈-0.7 dBi at about 8.2 GHz. The radiation pattern of the antenna showed directional properties with maximum gain in the bore-sight direction as expected with a patch antenna. To test the tuning capability, the impedance of the antenna was measured in the presence of a magnetostatic field which was generated by an electromagnet. The strength of the applied magnetic field varied from about 0 Oe to about 5 kOe. No change in the resonant frequency of the antenna was observed up to a bias strength of about 2 kOe because the magnetic fields were lost in the air due to the demagnetization effect. Above about 2 kOe, the frequency of the antenna began to tune down as shown in FIG. 25D. Increasing the fields beyond this value reduced the center frequency to about 3.7 kOe. A total tuning range of 1.25 GHz was obtained, which was about 12.5% of the center frequency. Further increasing the bias resulted in a slight increase in the resonant frequency of the antenna, which could be because the substrate was saturated for a bias field strength of about 3.7 kOe. After this value, strong fields were required to tune the antenna using the Polder's equations. The measured reflection coefficient of the antenna at a bias value of 3.7 kOe was shown in FIG. 25B. The antenna maintained its matching condition during the entire tuning range, which was required from such a design. No significant effect was expected on the antenna radiation pattern due to the applied bias, as it was reported that the radiation pattern of a ferrite-based patch antenna did not change significantly in the biased state.

In conclusion, this Example successfully performed the preparation of the iron oxide nanoparticles and their ink formulation to demonstrate the fully printed highly tunable inductor. Further, oleic acid functionalization and integration of nanoparticles with SU8 was performed to fabricate the first printed freestanding magnetic substrate. The materials were characterized in detail to obtain the morphological, structural, chemical, optical, and magnetic properties. Furthermore, the printed substrate was characterized for its magnetostatic and microwave properties. The magnetic substrate demonstrated a saturation magnetization of 1560 G and a calculated magnetization frequency of 4.37 GHz. To prove the functionality of the ink, a patch antenna design was implemented. The antenna successfully demonstrated the frequency tuning due to the application of magnetostatic fields across it. For a center frequency of 8 GHz, a tuning range of 12.5% was achieved at a magnetic field strength of 3.7 kOe. Such a functional ink was not only highly suitable for tunable and reconfigurable microwave devices, but could also be explored in sensing, biotechnology, and biomedical areas.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A printed tunable inductor, the printed tunable inductor comprising:
   one or more layers of cured nanoparticle ink; and
   one or more layers of cured silver organo complex (SOC) based silver ink,
   wherein the one or more layers of cured nanoparticle ink include magnetic iron oxide nanoparticles; and wherein the printed tunable inductor is sufficient to be tunable in response to an external magnetic field.

2. The printed tunable inductor of claim 1 further comprising a support substrate in contact with the one or more layers of cured nanoparticle ink.

3. The printed tunable inductor of claim 2, wherein the support substrate includes one or more of a plastic substrate, a glass substrate, and FR4 board.

4. The printed tunable inductor of claim 1, wherein the magnetic iron oxide nanoparticles include one or more of $Fe_2O_3$ and $Fe_3O_4$ nanoparticles.

5. A printed patch antenna, the printed patch antenna comprising:
   a printed magnetic substrate;
   a printed antenna; and
   a printed metallic ground plane,
   wherein the printed magnetic substrate includes functionalized iron oxide nanoparticles.

6. The printed patch antenna of claim 5, wherein the printed magnetic substrate further comprises a polymeric matrix, and wherein the functionalized iron oxide nanoparticles are embedded in the polymeric matrix.

7. The printed patch antenna of claim 6, wherein the polymeric matrix includes SU8 resin.

8. The printed patch antenna of claim 5 further comprising one or more smoothening layers.

9. The printed patch antenna of claim 8, wherein the one or more smoothening layers includes two smoothening layers, and wherein the two smoothening layers are on opposite sides of the printed magnetic substrate.

10. The printed patch antenna of claim 5, wherein the printed antenna includes one or more layers of cured silver organo complex (SOC) based silver ink.

11. The printed patch antenna of claim 5, wherein the printed metallic ground plane includes one or more layers of cured silver organo complex (SOC) based silver ink.

12. The printed patch antenna of claim 5 further comprising a coplanar waveguide (CPW) based ring resonator.

13. The printed patch antenna of claim 5, wherein the printed patch antenna is sufficient to be tunable by greater than 20% in response to an external magnetic field.

* * * * *